United States Patent
Kumawat et al.

(10) Patent No.: US 12,100,076 B2
(45) Date of Patent: *Sep. 24, 2024

(54) PRESERVING DOCUMENT DESIGN USING FONT SYNTHESIS

(71) Applicant: Adobe Inc., San Jose, CA (US)

(72) Inventors: Nirmal Kumawat, Rajsamand (IN); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,766

(22) Filed: Jun. 13, 2023

(65) Prior Publication Data

US 2023/0326104 A1 Oct. 12, 2023

Related U.S. Application Data

(60) Continuation of application No. 17/675,206, filed on Feb. 18, 2022, now Pat. No. 11,710,262, which is a division of application No. 16/656,132, filed on Oct. 17, 2019, now Pat. No. 11,295,181.

(51) Int. Cl.
*G06T 11/20* (2006.01)
*G06F 40/109* (2020.01)
*G06F 40/166* (2020.01)
*G06V 30/244* (2022.01)

(52) U.S. Cl.
CPC .......... *G06T 11/203* (2013.01); *G06F 40/109* (2020.01); *G06F 40/166* (2020.01); *G06V 30/245* (2022.01)

(58) Field of Classification Search
None
See application file for complete search history.

(56) References Cited

U.S. PATENT DOCUMENTS

| | | | |
|---|---|---|---|
| 5,034,991 A | 7/1991 | Hagimae et al. | |
| 5,060,276 A | 10/1991 | Morris | |
| 5,167,013 A | 11/1992 | Hube et al. | |
| 5,524,182 A | 6/1996 | Chari et al. | |

(Continued)

OTHER PUBLICATIONS

"Combined Search and Examination Report", GB Application No. 1710177.5, Dec. 13, 2017, 6 pages.

(Continued)

*Primary Examiner* — Sarah Le
(74) *Attorney, Agent, or Firm* — FIG. 1 Patents

(57) ABSTRACT

Automatic font synthesis for modifying a local font to have an appearance that is visually similar to a source font is described. A font modification system receives an electronic document including the source font together with an indication of a font descriptor for the source font. The font descriptor includes information describing various font attributes for the source font, which define a visual appearance of the source font. Using the source font descriptor, the font modification system identifies a local font that is visually similar in appearance to the source font by comparing local font descriptors to the source font descriptor. A visually similar local font is then synthesized by modifying glyph outlines of the local font to achieve the visual appearance defined by the source font descriptor. The synthesized font is then used to replace the source font and output in the electronic document at the computing device.

20 Claims, 29 Drawing Sheets

(56) References Cited

U.S. PATENT DOCUMENTS

| | | |
|---|---|---|
| 5,617,484 A | 4/1997 | Wada et al. |
| 5,664,086 A | 9/1997 | Brock |
| 5,754,187 A | 5/1998 | Ristow et al. |
| 5,806,078 A | 9/1998 | Hug et al. |
| 6,466,229 B1 | 10/2002 | Nagao |
| 6,738,526 B1 | 5/2004 | Betrisey et al. |
| 7,228,501 B2 | 6/2007 | Brown et al. |
| 7,478,325 B2 | 1/2009 | Foehr et al. |
| 8,271,470 B2 | 9/2012 | Gonzalez et al. |
| 8,330,760 B1 | 12/2012 | Arnold et al. |
| 8,385,971 B2 | 2/2013 | Rhoads et al. |
| 8,429,524 B2 | 4/2013 | Balinsky et al. |
| 8,509,537 B2 | 8/2013 | Perronnin et al. |
| 9,021,020 B1 | 4/2015 | Ramaswamy et al. |
| 9,047,511 B1 | 6/2015 | Vargis C et al. |
| 9,146,907 B1 | 9/2015 | Joshi et al. |
| 9,171,202 B2 | 10/2015 | Hull et al. |
| 9,202,142 B1 | 12/2015 | Conboy et al. |
| 9,224,068 B1 | 12/2015 | Ranzato |
| 9,336,204 B1 | 5/2016 | Amundsen et al. |
| 9,501,724 B1 | 11/2016 | Yang et al. |
| 9,576,196 B1 | 2/2017 | Natarajan |
| 9,805,288 B2 | 10/2017 | Kaasila et al. |
| 9,824,304 B2 | 11/2017 | Wang et al. |
| 9,875,429 B2 | 1/2018 | Wang et al. |
| 10,007,868 B2 | 6/2018 | Jin et al. |
| 10,074,042 B2 | 9/2018 | Wang et al. |
| 10,380,462 B2 | 8/2019 | Jin et al. |
| 10,467,508 B2 | 11/2019 | Wang et al. |
| 10,699,166 B2 | 6/2020 | Wang et al. |
| 10,783,409 B2 | 9/2020 | Jin et al. |
| 10,950,017 B2 | 3/2021 | Kumawat et al. |
| 11,295,181 B2 | 4/2022 | Kumawat et al. |
| 11,403,794 B2 | 8/2022 | Kumawat et al. |
| 11,710,262 B2 | 7/2023 | Kumawat et al. |
| 2002/0033824 A1 | 3/2002 | Stamm |
| 2005/0246410 A1 | 11/2005 | Chen et al. |
| 2006/0062460 A1 | 3/2006 | Jun et al. |
| 2006/0078204 A1 | 4/2006 | Fujimoto et al. |
| 2006/0236237 A1 | 10/2006 | Peiro et al. |
| 2007/0076959 A1 | 4/2007 | Bressan |
| 2008/0238927 A1 | 10/2008 | Mansfield |
| 2008/0303822 A1 | 12/2008 | Taylor et al. |
| 2009/0028443 A1 | 1/2009 | Chen et al. |
| 2009/0184980 A1 | 7/2009 | Mansfield |
| 2010/0010948 A1 | 1/2010 | Ito et al. |
| 2010/0183217 A1 | 7/2010 | Seung et al. |
| 2010/0324883 A1 | 12/2010 | Platt et al. |
| 2011/0115797 A1 | 5/2011 | Kaplan |
| 2011/0202487 A1 | 8/2011 | Koshinaka |
| 2011/0271180 A1 | 11/2011 | Lee |
| 2011/0276872 A1 | 11/2011 | Kataria et al. |
| 2011/0289407 A1 | 11/2011 | Naik et al. |
| 2011/0295612 A1 | 12/2011 | Donneau-Golencer et al. |
| 2012/0078908 A1 | 3/2012 | Djordjevic et al. |
| 2012/0240039 A1 | 9/2012 | Walker et al. |
| 2012/0256915 A1 | 10/2012 | Jenkins |
| 2013/0054612 A1 | 2/2013 | Danielyan et al. |
| 2013/0060786 A1 | 3/2013 | Serrano et al. |
| 2015/0062140 A1 | 3/2015 | Levantovsky et al. |
| 2015/0063713 A1 | 3/2015 | Yang et al. |
| 2015/0097842 A1 | 4/2015 | Kaasila et al. |
| 2015/0278167 A1 | 10/2015 | Arnold et al. |
| 2015/0339273 A1 | 11/2015 | Yang et al. |
| 2015/0348278 A1 | 12/2015 | Cavedoni et al. |
| 2015/0348297 A1 | 12/2015 | Kaasila et al. |
| 2015/0348300 A1 | 12/2015 | Kaplan |
| 2015/0371397 A1 | 12/2015 | Wang et al. |
| 2016/0078004 A1* | 3/2016 | Butler ............... G06F 21/10 715/269 |
| 2016/0259995 A1 | 9/2016 | Ishii et al. |
| 2016/0292589 A1 | 10/2016 | Taylor et al. |
| 2016/0307347 A1 | 10/2016 | Matteson et al. |
| 2016/0314377 A1 | 10/2016 | Vieira et al. |
| 2016/0314766 A1 | 10/2016 | Harrington et al. |
| 2017/0091951 A1 | 3/2017 | Yoo et al. |
| 2017/0098138 A1 | 4/2017 | Wang et al. |
| 2017/0098140 A1 | 4/2017 | Wang et al. |
| 2017/0098141 A1 | 4/2017 | Wang et al. |
| 2017/0109600 A1 | 4/2017 | Voloshynovskiy et al. |
| 2017/0262414 A1 | 9/2017 | Pao et al. |
| 2018/0082156 A1 | 3/2018 | Jin et al. |
| 2018/0089151 A1 | 3/2018 | Wang et al. |
| 2018/0114097 A1 | 4/2018 | Wang et al. |
| 2018/0239995 A1 | 8/2018 | Wang et al. |
| 2018/0247386 A1 | 8/2018 | Zheng et al. |
| 2018/0253878 A1 | 9/2018 | Jain et al. |
| 2018/0253883 A1 | 9/2018 | Shanbhag |
| 2018/0300592 A1 | 10/2018 | Jin et al. |
| 2019/0325277 A1 | 10/2019 | Jin et al. |
| 2020/0034671 A1 | 1/2020 | Maung |
| 2021/0012547 A1 | 1/2021 | Kumawat et al. |
| 2022/0172498 A1 | 6/2022 | Kumawat et al. |

OTHER PUBLICATIONS

"Corrected Notice of Allowability", U.S. Appl. No. 16/505,374, filed Feb. 10, 2021, 2 pages.
"Corrected Notice of Allowability", U.S. Appl. No. 15/853,120, May 7, 2020, 2 pages.
"Corrected Notice of Allowability", U.S. Appl. No. 15/962,514, filed Oct. 7, 2019, 2 pages.
"Corrected Notice of Allowability", U.S. Appl. No. 16/656,132, Mar. 9, 2022, 4 pages.
"Corrected Notice of Allowability", U.S. Appl. No. 16/590,121, Dec. 23, 2020, 5 pages.
"Corrected Notice of Allowance", U.S. Appl. No. 14/876,609, filed Jun. 29, 2018, 2 pages.
"Corrected Notice of Allowance", U.S. Appl. No. 14/876,667, filed Oct. 18, 2017, 2 pages.
"Corrected Notice of Allowance", U.S. Appl. No. 14/876,660, filed Oct. 25, 2017, 2 pages.
"Corrected Notice of Allowance", U.S. Appl. No. 14/876,660, filed Jul. 20, 2017, 4 pages.
"Corrected Notice of Allowance", U.S. Appl. No. 15/269,492, filed Feb. 13, 2018, 5 pages.
"CSS Fonts Module Level 3", Retrieved at: https://drafts.csswg.org/css-fonts/, Jan. 19, 2016, 88 pages.
"Designing Multiple Master Typefaces", Dec. 1995, 83 pages.
"Final Office Action", U.S. Appl. No. 15/853,120, Feb. 4, 2020, 10 pages.
"First Action Interview Office Action", U.S. Appl. No. 16/013,791, filed Jan. 18, 2019, 3 pages.
"First Action Interview Office Action", U.S. Appl. No. 16/502,608, filed May 27, 2020, 3 pages.
"First Action Interview Office Action", U.S. Appl. No. 16/505,374, filed Jul. 28, 2020, 3 pages.
"First Action Interview Office Action", U.S. Appl. No. 16/590,121, Dec. 9, 2020, 3 pages.
"First Action Interview Office Action", U.S. Appl. No. 17/114,232, filed Dec. 16, 2021, 3 pages.
"First Action Interview Pre-Interview Communication", U.S. Appl. No. 15/269,492, filed Oct. 24, 2017, 3 pages.
"Flexible Type: Methods and Applications of Modifying Glyph's Horizontal and Vertical Weight", Retrieved at: https://diglib.eg.org/handle/10.2312/egp20191039—on Aug. 7, 2019, 1 pages.
"Font Embedding and Substitution", Retrieved at: https://helpx.adobe.com/acrobat/using/pdf-fonts.html—on Aug. 7, 2019, 6 pages.
"Foreign Office Action", GB Application No. 1710177.5, Mar. 6, 2020, 4 pages.
"Intellectual property protection of typefaces—Wikipedia", Retrieved at: https://en.wikipedia.org/wiki/Intellectual_property_protection_of_typefaces—on Jun. 7, 2016, 4 pages.
"Multiple master fontshttps://en.wikipedia.org /wiki/Variable fonts", Retrieved at: https://en.wikipedia.org/wiki/Multiple_master_fontshttps://en.wikipedia.org/wiki/Variable_fonts—on Apr. 10, 2019, 1 page.
"Non-Final Office Action", U.S. Appl. No. 16/502,608, filed Apr. 22, 2020, 13 pages.

(56) References Cited

OTHER PUBLICATIONS

"Notice of Allowance", U.S. Appl. No. 16/013,791, filed Mar. 29, 2019, 10 pages.
"Notice of Allowance", U.S. Appl. No. 17/114,232, filed Mar. 31, 2022, 13 pages.
"Notice of Allowance", U.S. Appl. No. 15/962,514, filed Jun. 21, 2019, 13 pages.
"Notice of Allowance", U.S. Appl. No. 16/502,608, filed Jun. 18, 2020, 16 pages.
"Notice of Allowance", U.S. Appl. No. 14/876,667, filed Sep. 13, 2017, 16 pages.
"Notice of Allowance", U.S. Appl. No. 15/269,492, filed Jan. 18, 2018, 17 pages.
"Notice of Allowance", U.S. Appl. No. 15/853,120, filed Mar. 30, 2020, 8 pages.
"Notice of Allowance", U.S. Appl. No. 14/876,609, filed May 3, 2018, 8 pages.
"Notice of Allowance", U.S. Appl. No. 14/876,660, filed Jul. 6, 2017, 8 pages.
"Notice of Allowance", U.S. Appl. No. 16/505,374, filed Nov. 5, 2020, 8 pages.
"Notice of Allowance", U.S. Appl. No. 16/656,132, filed Nov. 30, 2021, 8 pages.
"Notice of Allowance", U.S. Appl. No. 16/590,121, filed Dec. 17, 2020, 8 pages.
"Pre-Interview Communication", U.S. Appl. No. 14/876,609, filed Feb. 21, 2018, 3 pages.
"Pre-Interview Communication", U.S. Appl. No. 14/876,660, filed Mar. 17, 2017, 3 pages.
"Pre-Interview Communication", U.S. Appl. No. 14/876,667, filed Jul. 28, 2017, 3 pages.
"Pre-Interview First Office Action", U.S. Appl. No. 15/962,514, filed Apr. 15, 2019, 3 pages.
"Pre-Interview First Office Action", U.S. Appl. No. 16/505,374, filed Jul. 7, 2020, 3 pages.
"Pre-Interview First Office Action", U.S. Appl. No. 15/853,120, Sep. 17, 2019, 3 pages.
"Pre-Interview First Office Action", U.S. Appl. No. 16/590,121, Nov. 3, 2020, 3 pages.
"Pre-Interview First Office Action", U.S. Appl. No. 16/502,608, filed Apr. 28, 2020, 4 pages.
"Pre-Interview First Office Action", U.S. Appl. No. 16/013,791, filed Nov. 23, 2018, 4 pages.
"Pre-Interview First Office Action", U.S. Appl. No. 17/114,232, filed Nov. 24, 2021, 4 pages.
"Pre-Interview First Office Action", U.S. Appl. No. 16/656,132, Aug. 9, 2021, 6 pages.
"Restriction Requirement", U.S. Appl. No. 15/962,514, filed Feb. 14, 2019, 6 pages.
"Restriction Requirement", U.S. Appl. No. 16/656,132, Jul. 6, 2021, 6 pages.
"Restriction Requirement", U.S. Appl. No. 14/876,609, filed Sep. 15, 2017, 7 pages.
"Supplemental Notice of Allowance", U.S. Appl. No. 14/876,667, filed Dec. 27, 2017, 2 pages.
"Variable Fonts", wikipedia.org, Wikimedia Foundation, Inc. [Retrieved Mar. 24, 2021]. Retrieved from the Internet <https://en.wikipedia.org/wiki/Variable_font>., 3 pages.
"W3C Recommendation—Fonts", Retrieved at: https://www.w3.org/TR/2011/REC-CSS2-20110607/fonts.html, 2011, 9 pages.
U.S. Appl. No. 17/675,206, , "Non-Final Office Action", U.S. Appl. No. 17/675,206, Dec. 8, 2022, 83 pages.
U.S. Appl. No. 17/675,206, , "Notice of Allowance", U.S. Appl. No. 17/675,206, Mar. 3, 2023, 11 pages.
Bell, Sean et al., "Learning visual similarity for product design with convolutional neural networks", ACM Transactions on Graphics (TOG)—Proceedings of ACM SIGGRAPH, Aug. 2015, 10 pages.
Cronin, Shaun , "The Web Designer's Guide to Font Replacement Methods", Retrieved at: http://webdesign.tutsplus.com/articles/the-web-designers-guide-to-font-replacementmethods--webdesign-975, Aug. 3, 2011, 1 page.
Gaultney, Victor , "Font Licensing and Protection Details", Aug. 5, 2003, 3 pages.
Hudson, John , "Introducing OpenType Variable Fonts", Sep. 14, 2016, 15 pages.
Knuth, Donald E. , "The Concept of a Meta-Fong", Dec. 1982, 25 pages.
O'Donovan, Peter et al., "Exploratory Font Selection Using Crowdsourced Attributes", ACM Transactions on Graphics, Jul. 27, 2014, 9 pages.
Oliver, Owen , "Font Replacement Methods: Techniques for Web Fonts", Retrieved at: http://www.instantshift.com/2013/08/29/font-replacement-methods/, Aug. 29, 2013, 11 pages.
Ross, , "The Law on Fonts and Typefaces: Frequently Asked Questions", Retrieved at: http://blog.crowdspring.com/2011/03/font-law-licensing, Mar. 23, 2011, 7 pages.
Schoff, Florian et al., "FaceNet: A Unified Embedding for Face Recognition and Clustering", CVPR 2015, Mar. 12, 2015, pp. 815-823.
Shamir, Ariel et al., "Extraction of Typographic Elements from Outline Representations of Fonts", Aug. 1996, 12 pages.
Wang, Jiang et al., "Learning Fine-grained Image Similarity with Deep Ranking", CVPR 2014, Apr. 7, 2014, 8 pages.
Wang, Zhangyang et al., "DeepFont: Identify Your Font from An Image", Proceedings of the 23rd ACM international conference on Multimedia (MM '15). Association for Computing Machinery, New York, NY [retrieved Dec. 19, 2022]. Retrieved from the Internet <https://arxiv.org/pdf/1507.03196.pdf>., Jul. 12, 2015, 9 pages.
Zongker, Douglas E. et al., "Example-Based Hinting of True Type Fonts", SIGGRAPH '00: Proceedings of the 27th annual conference on Computer graphics and interactive techniques [retrieved Dec. 19, 2022]. Retrieved from the Internet <https://doi.org/10.1145/344779.344969>, Jul. 1, 2000, 6 pages.

\* cited by examiner

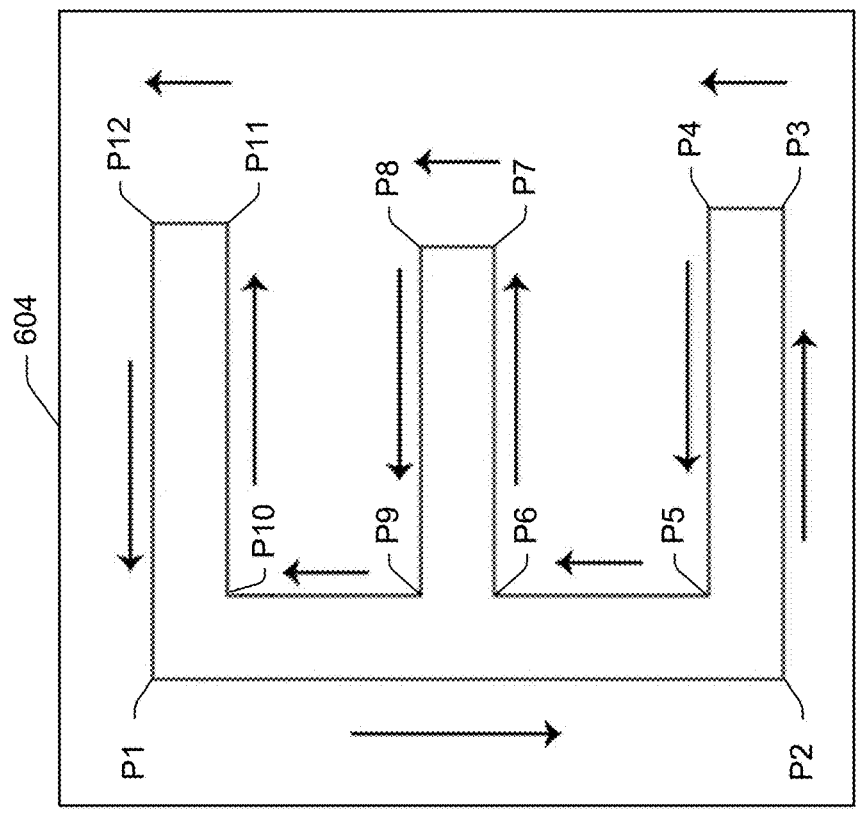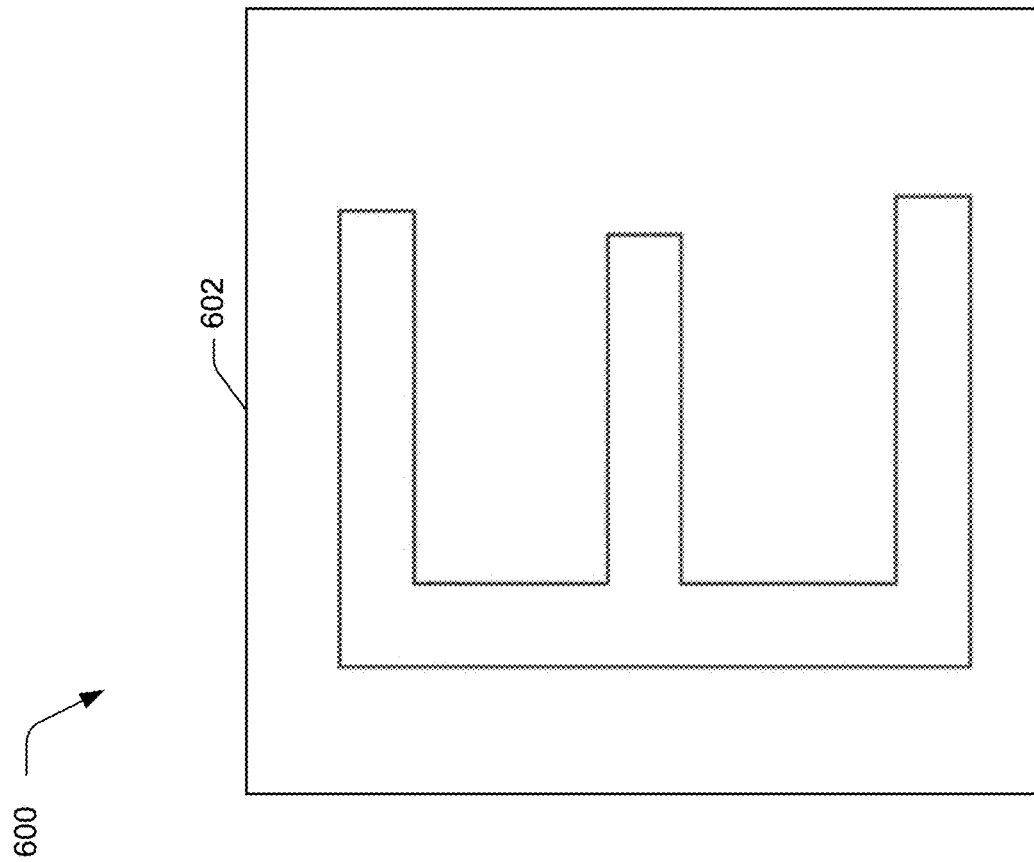
Fig. 6

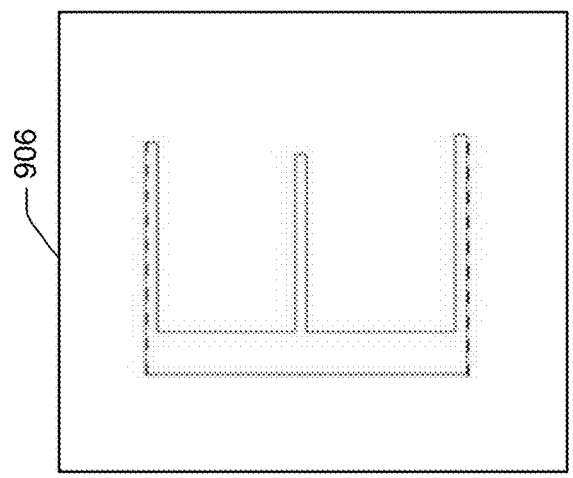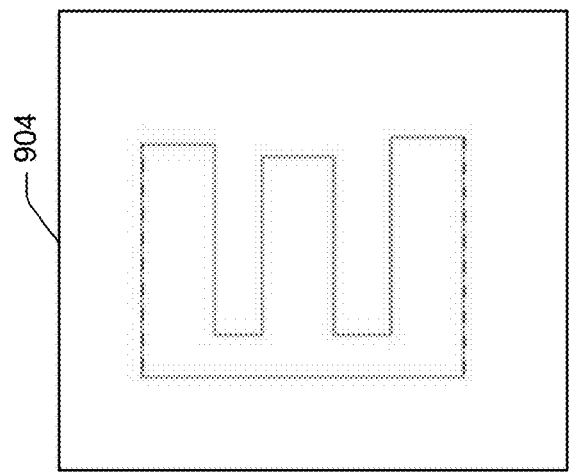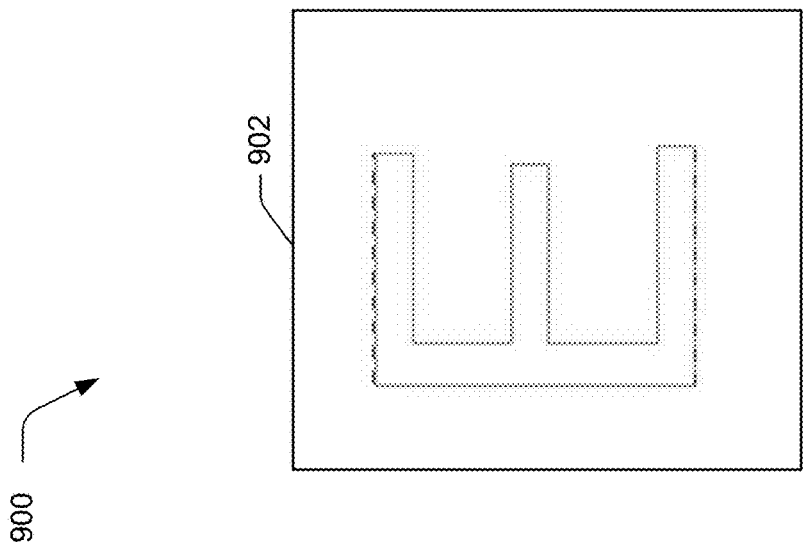
Fig. 9

PRESERVING DOCUMENT DESIGN USING FONT SYNTHESIS

RELATED APPLICATION

This application claims priority to U.S. patent application Ser. No. 17/675,206, filed Feb. 18, 2022, entitled "Preserving Document Design Using Font Synthesis," which is a division of and claims priority to U.S. patent application Ser. No. 16/656,132, filed Oct. 17, 2019, entitled "Preserving Document Design Using Font Synthesis," the disclosures of which are hereby incorporated by reference in their entireties.

BACKGROUND

In many forms of digital content, a visual appearance of text is often a significant aspect involved in conveying the intended meaning of a given design. For instance, different fonts may be used to render the same text in different appearances, which may be carefully chosen to establish a mood, convey a desired aesthetic, stimulate an emotion, communicate a meaning, generate interest, provide a unifying theme, attract attention, and so forth. Unfortunately, problems arise when digital content is communicated among different computing devices. To render text using the visual appearance of a desired font, a computing device references the desired font to access instructions for rendering individual glyphs of the font. However, not all fonts are present on all computing devices. A font that is available on a source computing device may not be available on a destination computing device due to any of a number of possible reasons.

In some situations, a desired font can be embedded in a file having a given design. In these situations, the font is automatically communicated along with the design. But such embedding is not always feasible. First, technical issues may preclude embedding. For instance, there may not be sufficient bandwidth to include the font in the file having the design. Also, there is no guarantee that a destination computing device is capable of rendering text with a particular embedded font. Second, legal issues may preclude embedding a font into a file having a design. Generally, a person purchases a non-transferable right (e.g., a license) to use a font on a single computing device or a set number of computing devices. A user may therefore not have a legal right to embed a font into a design being transmitted to a destination computing device, or the destination computing device may lack a license to use the font legally.

For these reasons, embedding a font into a design is often infeasible. Consequently, a destination computing device may receive a design that identifies a font without embedding the identified font. The destination computing device is then responsible for determining a replacement font for the missing font. Conventional approaches to determining replacement fonts in an ad-hoc manner and rely on heuristic rules that only work for a limited set of fonts. Because not all fonts share common typographic properties, replacing a font with a substitute font often results in distributing an original design layout for an electronic document. Some conventional approaches to replacing a font include utilizing multiple master fonts. These conventional approaches generate a replacement font by interpolating between two or more master fonts. However, the resulting interpolated font differs from respective visual appearances of the multiple master fonts and result in replacement fonts that are visually dissimilar to a source font being replaced.

Thus, conventional approaches to font replacement fail to maintain the visual appearance of text as desired by the creative professional that generated the design. Consequently, the overall intended meaning and effect of the design is compromised.

SUMMARY

Automatic font synthesis for modifying a local font to have a visually similar appearance to a source font in an electronic document is described. A font modification system receives the electronic document including the source font from a different computing device. In response to determining that the computing device is unable to render or otherwise use the source font, the font modification system extracts a font descriptor for the source font from the electronic document. The font descriptor includes information describing various font attributes for the source font, which refer to properties that are useable to define a visual appearance of the source font. Using the font descriptor for the source font, the font modification system identifies a local font that is visually similar in appearance to the source font and is available for use by the computing device.

To do so, the font modification module is configured to generate local font descriptors for each local font available for use by the computing device. The local font descriptors are then compared with the font descriptor for the source font and the local font having the closest visual similarity is selected for synthetization. The local font is then synthesized by modifying an outline of at least one glyph of the local font, based on the font attribute values specified in the source font descriptor, such that the modified glyph outline is visually similar in appearance to a corresponding glyph of the source font. The synthesized font is then used to replace the source font in the electronic document such that the electronic document can be output for display at the computing device in a manner that emulates the original design layout for the electronic document.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 6 illustrates an example of a glyph outline for a glyph of a font.

FIG. 9 illustrates an example implementation in which the font modification system of FIG. 1 synthesizes font by modifying the font's vertical weight.

DETAILED DESCRIPTION

Overview

Figure 1:
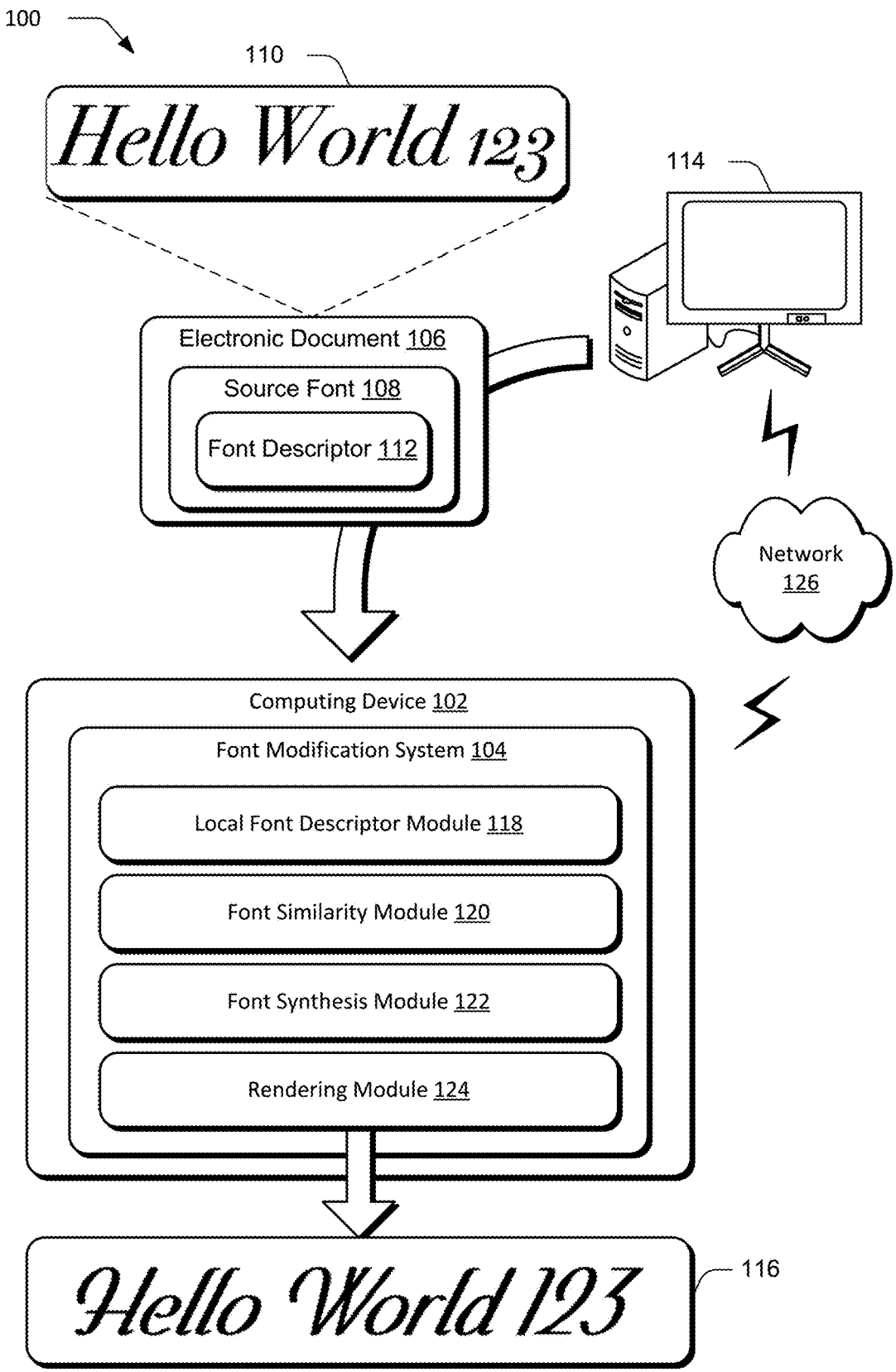
FIG. 1 is an illustration of an environment in an example implementation that is operable to employ the font synthesis techniques described herein.

Due to technical and legal difficulties electronic document creators are often precluded from embedding a source font into the electronic document at source computing device where the electronic document is generated. Upon reception of such a document at a different computing device, the different computing device is forced to determine a replacement for the source font. Asking a user to select a local font is inconvenient and time consuming for the user, and does not ensure that the visual appearance of the source font will be maintained. Although a user-independent heuristics-based approach to font replacement can be employed, such a heuristics-based approach is ad-hoc and is therefore both unreliable and limited in applicability. Consequently, conventional approaches to font replacement do not provide any reasonable expectation that the aesthetic intentions or communication goals of a given design can be maintained when the source font is not available for use by a computing device presenting the electronic document.

Systems and techniques for preserving document design using font synthesis are described herein. A computing device implementing a font modification system receives an electronic document that includes a source font which is unavailable for use by the computing device. A visual appearance of the source font is defined based on a font descriptor, which includes information describing font attributes for the source font and is embedded in the electronic document. The font modification system includes a local font descriptor module that is configured to generate local font descriptors for each local font that is available to the computing device implementing the font modification system. Using the font descriptor of the source font and the local font descriptors generated by the local font descriptor module, the font modification system implements a font similarity module that is configured to recognize similarity between visual appearances of the source font and different local fonts. In some implementations, font similarity is identified using a machine learning system tuned to recognize similarity between the visual appearances of two different fonts.

Although a visually similar local font can be used to replace the source font, simply replacing the source font with the visually similar local font does not provide any assurance that an original design layout of the electronic document will be preserved. To address this shortcoming of conventional approaches, the font modification system is configured to modify an outline of one or more glyphs of the visually similar local font to emulate a visual appearance of the source font. Although conventional approaches for glyph modifications exist, such conventional approaches perform glyph modification by scaling glyph outlines to modify respective width or height properties of the glyph. This conventional scaling approach results in distortion of glyph stroke weights, and thus fail to achieve a visually similar appearance to a source font being replaced.

Other conventional systems for modifying a visual appearance of text require at least two master fonts which are original fonts. These systems interpolate between the at least two master fonts to generate a new font. A visual appearance of the new font differs from a visual appearance of the at least two master fonts based on the interpolation.

These systems require generation of a new font file to change the visual appearance of the text which may not be compatible across applications. Conventional systems which allow a single font file to store a continuous range of design variants may also be used to change a visual appearance of text. However, even these systems are limited to changing visual appearance using modification values of the single font file which may be limited in terms of the functionality which they can provide. For these systems, the modification values may only allow modification of a single visual feature of the text.

To address these shortcomings of conventional approaches, the font modification system is configured to generate synthesized font by modifying an outline of glyphs for a local font in a manner that achieves font attributes similar to those of the source font. To do so, the font modification system is configured to represent individual glyphs using as segments such that each of the segments has a start point, an endpoint, and a direction based on the start point and the endpoint. For example, the system can represent the outline of the glyph as Bezier paths.

Given the outlines of font glyphs and respective font descriptors of the source font and local font to be modified in generating synthesized font, the font modification system computes a design vector array that describes differences between similar font attributes of the source font and local font. In some implementations, the font modification system is configured to compute a design vector array on a per-line basis for each line of source font to be replaced in the electronic document. The resulting design vector array is then used to generate synthesized font by modifying respective glyph outlines of the local font in a manner that results in the synthesized font having a similar visual appearance to the source font.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Terminology Examples

Example descriptions or explanations of certain terms as used herein are set forth below. Each term is applicable to one or more, but not necessarily all, implementations described herein. Some terms are further elucidated using one or more examples.

An "electronic document" refers to a visible creation such as a design or an electronic file that embodies the visible creation. Examples of electronic documents include marketing materials such as digital pamphlets, book illustrations, presentations such as slide decks, web pages, word processing products, content output via applications, combinations thereof, and so forth. An electronic document can include text rendered in accordance with a given font.

A "font" refers to a digital representation (e.g., a file or some code) of a typeface or a specific style thereof. Examples of typefaces include Times New Roman, Helvetica, Calibri, Baskerville Old Face, Britannic Bold, Neuropol, Vladimir Script, and Courier New. Historically, each typeface was one particular point size because letters were made from individual physical stamps. In modern digital environments, however, a font can include or be usable to produce characters at many different point sizes. A font may also be considered to include basic style variations or effects, such as italics or bold. A font provides instructions for digitally rendering text in accordance with the associated typeface.

A "local font" refers to a font that is present at, and available for rendering text on, a given computing device. The adjective "available" in the context of a "font" refers to when a computing device is legally and technically capable of using the font to render text. Conversely, an "unavailable font" refers to a font that is not present at a computing device or a font that the computing device is unable to use to render text due to legal constraints or technical abilities.

A "similar font" refers to a font having an appearance that is visually comparable to another font. Font similarity can be based on relative similarity, such as one or more fonts that are the most similar (e.g., have a smallest distance between two font descriptors) from among a set of available fonts. Alternatively, font similarity can be based on objective similarity, such as a maximum threshold distance between two font descriptors that respectively correspond to two different fonts. A "visually-similar font" refers to a font that is similar based on visible characteristics or attributes. In a character-by-character font replacement scenario, a similar font includes a similar individual character, and a visually-similar font includes a visually-similar individual character.

A "visual appearance" refers to visible characteristics or attributes of text rendered in accordance with a given font. The visual appearance can be separate from the instructions used to render a font or independent of font metadata, such as name, family, and so forth. Aspects of the visual appearance of a font are at least partially detectable by the human eye at some resolution. The visual appearance of a font can be embodied in an image of text rendered in accordance with the font. Related to the visual appearance of a font is a "distance" aspect between two or more font descriptors that indicates how similar two font descriptors are to one another, and thus how similar the two corresponding fonts are to each other. The distance between two font descriptors is determined by a destination computing device that receives a document having a font descriptor. A distance between two font descriptors is realized as, for example, a pairwise difference between two feature vectors.

An "image" refers to an output of a font. The output can be realized as some bitmapped product of the font having text that is rendered at some resolution. The image can include one or more glyphs rendered in accordance with the instructions of the font. For example, multiple glyphs that include a set of uppercase letters or a set of lowercase letters can be rendered. An image can also include a single glyph rendered for an individual character of a font.

A "glyph" refers to a physical shape or form that is perceivable by the human eye and connotes a corresponding textual character. A computing device renders a glyph on a display screen or on a physical hard copy. A glyph is specific to how a particular font renders a given character, but a character transcends multiple fonts. Examples of characters include a letter of an alphabet, a symbol, an ideograph, punctuation, an emoji, a logogram, or any other human–readable or interpretable form that can be represented as text using a computing device. Thus, fonts can include those directed to the Chinese, Japanese, or Korean character-based languages, as well as directed to letter-based languages.

"Machine learning" refers to technology in a digital environment that is capable of producing an output based on an input using knowledge or intelligence garnered from training. In a supervised learning implementation, training samples are input to a machine learning system during training so that the machine can learn about at least one relationship incorporated into the training samples, such as font similarity. After the training, a machine learning apparatus can produce an output based on an input using the learned relationship. Examples of implementation techniques for machine learning for unsupervised or supervised learning may include association rule learning, support vector machines (SVMs), Bayesian networks, regression, artificial neural networks, convolutional neural networks, deep learning, and combinations thereof. As used herein, a "machine learning system" can produce a model that incorporates a learned relationship.

A "font visual similarity model" refers to a model produced with machine learning so as to characterize fonts such that the fonts can be compared to one another in terms of at least visual similarity. A font visual similarity model can be implemented as, for example, a processor-executable module, a convolutional artificial neural network, or a combination thereof. If an image including multiple glyphs that are rendered by a given font is input to a font visual similarity model, the model can output a font descriptor having multiple font features that correspond to visual appearance aspects of the given font.

A "font descriptor" refers to a product of a font visual similarity model that characterizes a visual appearance of a font using font features. A font descriptor corresponding to one font can be compared to a font descriptor corresponding to another font to compute a semantic distance between the two fonts, with the semantic distance indicative of a visual similarity between the two fonts. "Font attributes" refer to different dimensions for characterizing the visual appearance of a font. Font attributes result from application of machine learning technology to the font image. A "per-character font descriptor" refers to a font descriptor that is directed to an individual character of a font.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 27.

The computing device 102 is illustrated as including font modification system 104. The font modification system 104 represents functionality of the computing device 102 to receive an electronic document 106 containing source font 108. The source font 108 is formatted to have a visual appearance 110 that is defined by a font descriptor 112. As described in further detail below with respect to FIG. 3, the font descriptor 112 includes information describing various font attributes for visual appearance 110 of the source font 108. In the illustrated example, computing device 102 receives the electronic document from a different computing device 114.

In accordance with one or more implementations, the source font 108 may be a font that is authorized for use on the different computing device 114 and not authorized for use on the computing device 102. In order to output a display of the electronic document 106 in a manner that maintains visual similarity to an original design layout, the computing device 102 is configured to leverage the font modification system 104 to generate a synthesized font 116. The synthesized font 116 can then be used to replace the source font 108 and output the electronic document 106 at the computing device 102 in a manner that preserves an original design layout of the electronic document 106 without requiring the computing device 102 to obtain a license or other authorization to use the source font 108.

To generate synthesized font 116, the font modification system 104 implements a local font descriptor module 118, a font similarity module 120, a font synthesis module 122, and a rendering module 124. The local font descriptor module 118, the font similarity module 120, the font synthesis module 122, and the rendering module 124 are each implemented at least partially in hardware of the computing device 102 (e.g., through use of a processing system and computer-readable storage media), as described in further detail below with respect to FIG. 27.

The local font descriptor module 118 is configured to identify at least one local font that is available for use by the computing device 102 and has a visually similar appearance to the source font 108. To identify local fonts that are visually similar to the source font 108, the local font descriptor module 118 is configured to compute font descriptors for each local font available for use by the computing device 102, as described in further detail below with respect to FIG. 4.

After computing the font descriptors for available local fonts, the font similarity module 120 compares the font descriptor 112 of the source font 108 with font descriptors for the local fonts that were computed by the local font descriptor module 118. From this comparison, the local font similarity module 120 outputs a sorted list of visually similar fonts that are available to the computing device 102 and differ from the source font 108 based on one or more font attribute values.

The sorted list of visually similar fonts is then useable by the font synthesis module 122 to select a local font available to the computing device 102 that has a visually similar appearance to the source font 108 as used in the electronic document 106 and generate the synthesized font 116. To generate the synthesized font 116, the font synthesis module 122 modifies an outline of one or more glyphs of the local font, rather than modifying an original font-program of the local font. In this manner, the font synthesis module 122 modifies a visual appearance of one or more font glyphs in a manner that makes the synthesized font 116 appear typographically correct when compared to the source font 108 as included in the electronic document 106. Modification of glyph outlines is described and illustrated in further detail below with respect to FIGS. 6-23.

The modified glyph outlines of the local font are then passed to the rendering module 124, which is configured to output a display of the synthesized font 116. The rendering module 124 is representative of functionality to output the synthesized font 116 in a variety of manners, such as in a preview display of a user interface for the font modification system 104, in an instance of the electronic document 106 where the synthesized font replaces the source font 108, combinations thereof, and so forth.

The synthesized font 116, a modified instance of the electronic document 106 that includes the synthesized font 116, font descriptors computed by the local font descriptor module 118, lists of visually similar fonts generated by the font similarity module 120, and other information generated by the font modification system 103 may be stored in storage of the computing device 102, as described in further detail below with respect to FIG. 27. Alternatively or additionally, information generated by the font modification system 104 may be provided to a remote storage location for subsequent retrieval and/or access by the computing device 102 or different computing devices. For instance, the font modification system 104 may communicate information to the different computing device 114 or another remote storage location, via network 126.

Having considered an example digital medium environment, consider now a discussion of an example system useable to generate synthesized font in accordance with aspects of the disclosure herein.

Figure 2:
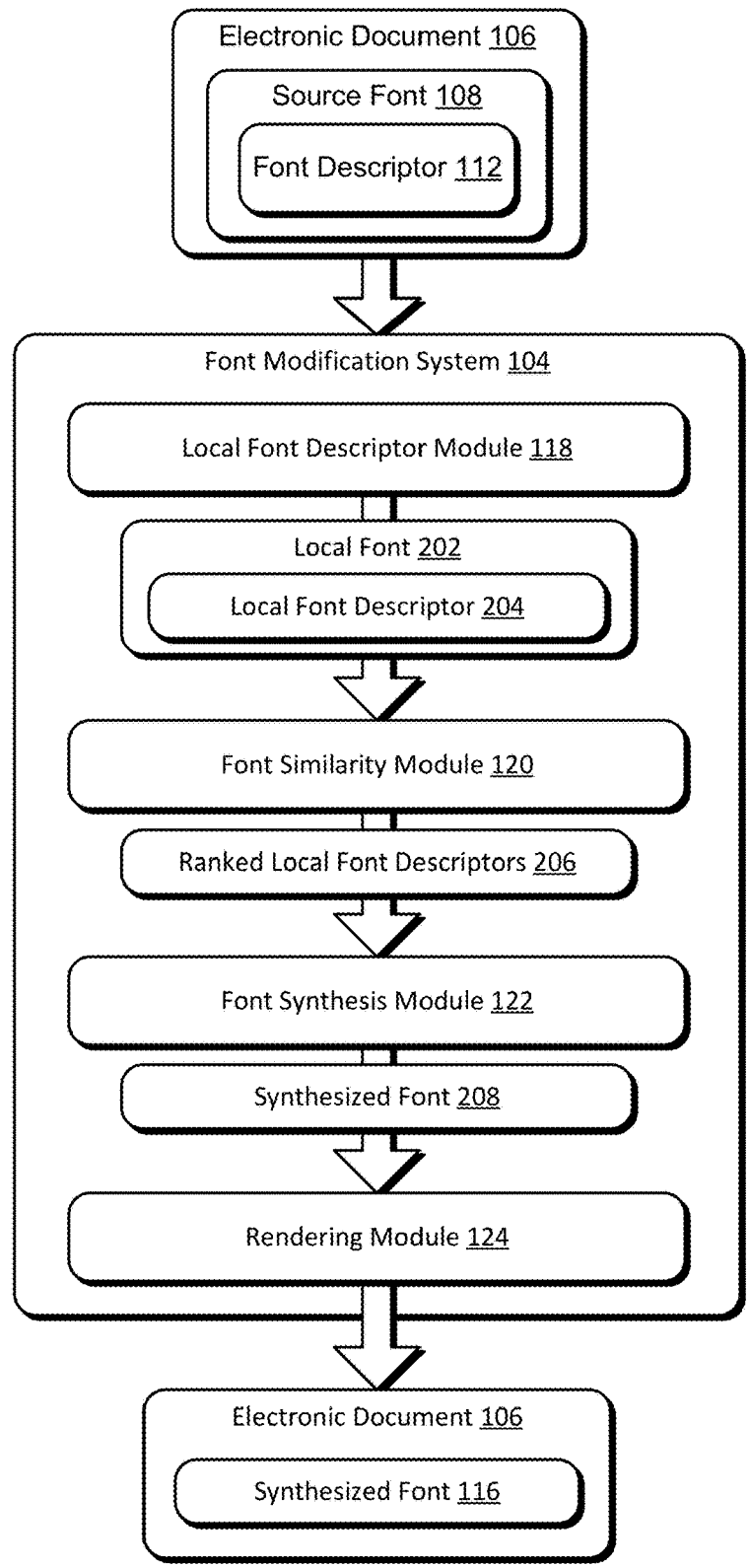
FIG. 2 illustrates an example implementation in which the font modification system of FIG. 1 generates an electronic document that includes synthesized font using techniques described herein.

FIG. 2 illustrates an example system 200 useable to generate an electronic document 106 including synthesized font 116 generated based on a source font 108 in accordance with the techniques described herein. In the illustrated example, system 200 includes modules of the font modification system 104 as described with respect to FIG. 1, such as the local font descriptor module 118, the font similarity module 120, the font synthesis module 122, and the rendering module 124. System 200 may be implemented on any suitable device or combination of devices. In one example, system 200 is implemented on one computing device (e.g., computing device 102 of FIG. 1). In another example, system 200 is implemented on more than one computing device, as described in further detail below with respect to FIG. 27.

In the example system 200, the font modification system 104 receives an electronic document 106 that includes at least one source font 108 having a visual appearance defined by font descriptor 112. As described herein, the electronic document 106 is received by the font modification system 104 with a font file for the source font 108 embedded in the electronic document 106. The font descriptor 112 is representative of information embedded in metadata of the electronic document 106, and refers to a vector of real numbers indicating a plurality (e.g., hundreds) of different dimensions, where each dimension represents a font attribute value.

Various font attributes represented by the font descriptor may include information that is useable to define a font family for the font, relationship of fonts within a font family to one another, and categorical attributes that generally describe a font's visual appearance, such as font attributes as described in further detail below with respect to FIG. 3. Although the font descriptor 112 includes information that is useable to define a visual appearance of the source font 108, the font descriptor is not reversible by the font modification system 104 to output the source font 108 itself.

Upon receiving the electronic document 106, the font modification system 104 communicates the font descriptor 112 for the source font 108 to the local font descriptor module 118. The local font descriptor module 118 is configured to identify at least one local font 202, which is representative of a font that is available for use by the computing device implementing the font modification system 104. For each local font 202, the local font descriptor module 118 computes a local font descriptor 204, as described in further detail below with respect to FIG. 4. Each local font descriptor 204 refers to a vector of real numbers indicating a plurality (e.g., hundreds) of different dimensions, where each dimension represents a font attribute value. Various font attributes represented by an individual local font descriptor 204 may include information that is useable to define a font family for the font, relationship of fonts within a font family to one another, and categorical attributes that generally describe a font's visual appearance, such as font attributes described in further detail below with respect to FIG. 3.

In some implementations, a font descriptor may be extracted as neuron responses from a convolutional neural network that receives a rendered text image for a given font as input, such as a font visual similarity model as described in further detail below with respect to FIG. 3. Example font descriptor vectors for three different fonts are illustrated below in Table 1, which includes only the first three entries for each font descriptor for brevity, rather than the hundreds of dimensions otherwise represented by a single font descriptor.

TABLE 1

| Font | Font Descriptor |
| --- | --- |
| A | [0.23, 0.12, −0.96, . . . ] |
| B | [0.10, 0.06, −0.99, . . . ] |
| C | [0.92, 0.35, 0.17, . . . ] |

In order to measure the similarity between different fonts, the font similarity module 120 is configured to compute the inner product of the vector dimensions for two different fonts. For instance, using example font descriptors for fonts A and B as indicated in Table 1, the font similarity module is configured to determine a similarity score S(A,B) according to Equation 1.

$$S(A,B)=(0.23)\times(0.10)+(0.12)\times(0.06)+(-0.96)\times(-0.99)+\ldots =0.98 \quad (Eq.1)$$

In a similar manner, the font similarity module 120 is configured to compute a similarity score for fonts A and C, S(A,C), according to Equation 2.

$$S(A,C)=(0.23)\times(0.92)+(0.12)\times(0.35)+(-0.96)\times(0.17)+\ldots =0.09 \quad (Eq.\ 2)$$

Using the example fonts of Table 1 and the font similarity computations of Equations 1 and 2, font A may be representative of source font 108, where fonts B and C correspond to different local fonts 202 that are available for use by a computing device implementing the font modification system 104.

The local font descriptors 204 are then communicated along with the font descriptor 112 for the source font 208 to the font similarity module 120. The font similarity module 120 then generates a list of ranked local font descriptors 206, which describes a visual similarity between the source font 108 and each of the local fonts 202, as described by the respective font descriptor 112 and local font descriptors 204.

Using the example similarity scores S(A,B)=0.98 and S(A,C)=0.09, computed using the information of Table 1 above, are useable by the font similarity module 120 to output the list of ranked local font descriptors 206. Because visual similarity scores computed by the font similarity module 120 are normalized on a scale of 0 to 1, with zero indicating no visual similarity and one indicating an identical visual appearance, the scores computed in the example Equations 1 and 2 indicate that font B has a visual appearance that is more similar to font A than a visual appearance of font C to font A. Using this example, a semantic distance between the visual appearances of two fonts is smaller when the inner product of the vector dimensions for two different fonts, as indicated by their respective font descriptors, is closer to one.

In accordance with one or more implementations, the font similarity module 120 is configured to generate the list of ranked local font descriptors 206 using a font visual similarity model, as described in further detail below with respect to FIG. 3. The ranked local font descriptors 206 are then communicated to the font synthesis module 122.

The font synthesis module 122 is configured to select a local font 202 that is visually similar to the source font 108 based on the ranked local font descriptors 206 and modify the selected local font to generate synthesized font 208. To do so, the font synthesis module 122 modifies an outline of one or more glyphs of the selected local font by adjusting a position of one or more points of the glyph that connect lines or segments defining the glyph's outline in a manner that maintains a typographically correct appearance of the source font 108 as included in the electronic document 106. Thus, a particular manner in which the font synthesis module 122 modifies the selected local font to generate the synthesized font 208 varies based on specific font attributes for each of the selected local font and source font 108, as indicated by their respective font descriptors. Various glyph modifications useable by the font synthesis module 122 to generate the synthesized font 208 are described in further detail below with respect to FIGS. 6-23.

Generally, the operations performed by the font synthesis module 122 in generating the synthesized font 208 are performed according to Algorithm 1:

respective font descriptors according to Equation 4, where twi corresponds to the width of an ith glyph for the synthesized font 208:

$$tW = \Sigma_{i=0}^{n} twi \quad \text{(Eq. 4)}$$

The font synthesis module then obtains the design vector for each text line: DV[7]=GetDesignAxisValueToMakeSimilarAttribute (sW, tW) for use in Algorithm 1. Thus, DV[7] will be different for each line of text in the electronic document 106 in order to preserve its original design layout. In this manner, the font synthesis module 122 is configured to output the design vector array computed according to Algorithm 1 for each line of source font 108 to be replaced in the electronic document. The resulting design vector array is used to generate the synthesized font 208 by modifying respective glyph outlines of the local font 202, as described in further detail below.

The synthesized font 208 is then output for display by the rendering module 124. In some implementations, the rendering module 124 is configured to output a preview display of the synthesized font 208 in a user interface of the font modification system 104, optionally together with a display of the source font 108. The preview display of the synthesized font 208 may be displayed on its own, independent of any other font glyphs, or as part of the electronic document 106 to represent an appearance of the electronic document 106 with the synthesized font 208 replacing the source font 1. Receive input indicating the font descriptor 112 and the local font descriptor 204 for the local font 202 to be modified in order to output synthesized font 208.
2. Fetch design axes values using to align typographic attributes of the local font 202 with the source font 108 (steps 3-10):
3. DV[0] = GetDesignAxisValueToMakeSimilarAttribute(sFD.stemV, F.stemV); // for Stem V
4. DV[1] = GetDesignAxisValueToMakeSimilarAttribute (sFD.stemH, F.stemH); // For StemH
5. DV[2] = GetDesignAxisValueToMakeSimilarAttribute (sFD.xHeight, F.xHeight); // For xHeight
6. DV[3] = GetDesignAxisValueToMakeSimilarAttribute (sFD.CapHeight, F.CapHeight); // For CapHeight
7. DV[4] = GetDesignAxisValueToMakeSimilarAttribute (sFD.Ascent, F.Ascent); // For Ascender height
8. DV[5] = GetDesignAxisValueToMakeSimilarAttribute (sFD.Descent, F.Descent); // For Descender depth
9. DV[6] = GetDesignAxisValueToMakeSimilarAttribute (sFD.ItalicAngle, F.ItalicAngle); // For Italic angle.
10. DV[7] = Compute design vector for width.
11. Output design vector ("DV") array.

In order to compute a width design vector, because each glyph of a font may have different width attributes, different design vector values may be required for every glyph. Consequently, modifying each glyph to achieve a same width in order for text to fit in a designated layout will not preserve the original design layout for an electronic document. Accordingly, the font synthesis module 122 is configured to compute a width design vector for each text line of the source font 108 as rendered in the electronic document 106. To do so, the font synthesis module 122 computes, for each text line of the source font 108, the total width of the text line (sW) using a width from a widths array of the source font 108's font descriptor 112 (sFD), where sWi corresponds to the width of the source font 108 in Equation 3:

$$sW = \Sigma_{i=0}^{n} sWi \quad \text{(Eq. 3)}$$

The font synthesis module 122 additionally computes, for each line of text of the source font 108, the total text line width as a target width (tW) using width values from the 108. In some implementations, a preview of the synthesized font 208 may be displayed by the rendering module 124 together with one or more user interface controls that enable a user of the computing device implementing the font modification system 104 to fine-tune various glyph modifications used to generate the synthesized font 208. Alternatively or additionally, the rendering module 124 is configured to automatically output an instance of the electronic document 106 that includes the synthesized font 208 in place of the source font 108, such as an instance of the electronic document 106 with the synthesized font 116 displayed in place of the source font 108.

Having considered an example system, consider now example details of generating an electronic document including synthesized font in place of source font in accordance with the techniques described herein.

Figure 3:
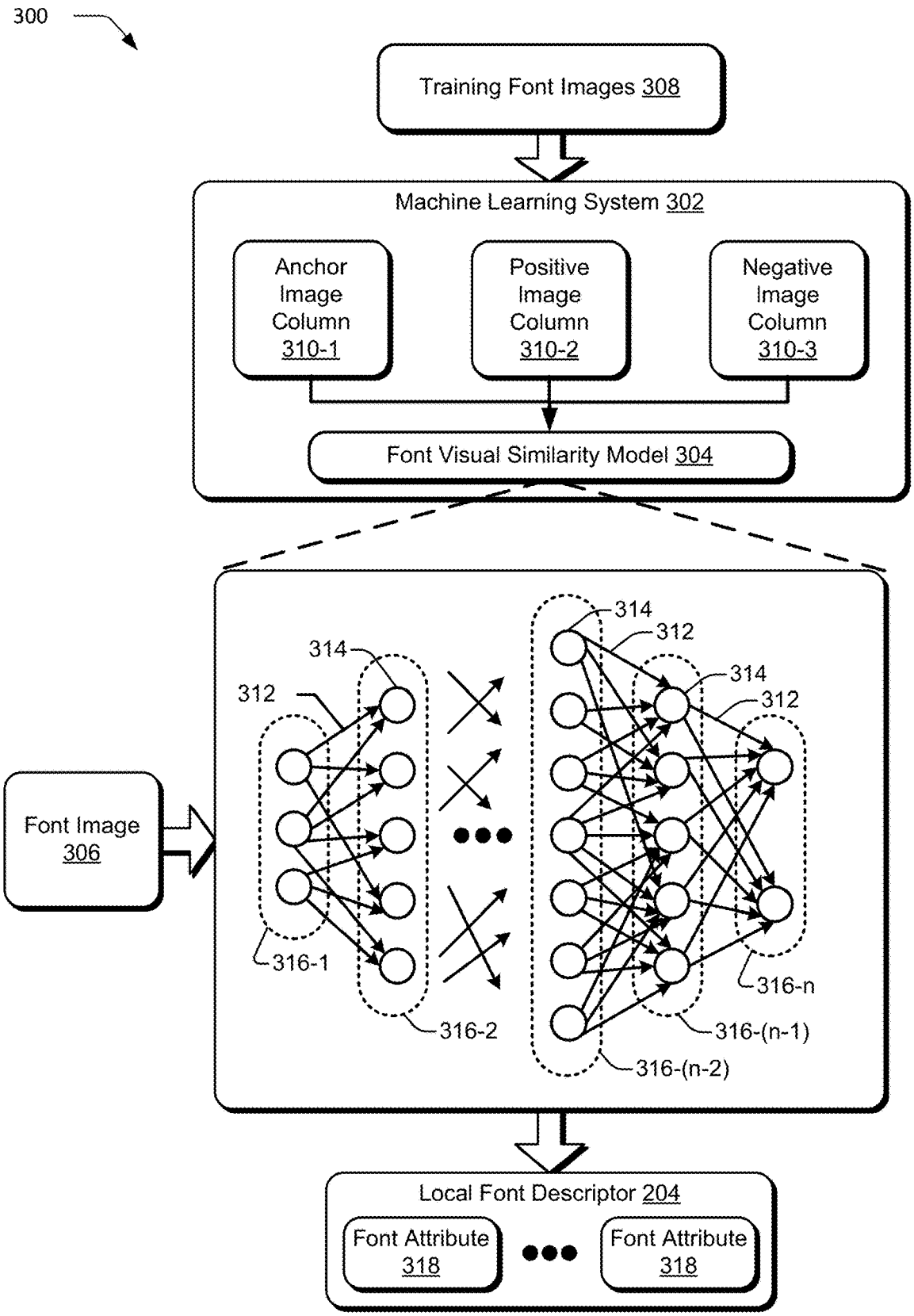
FIG. 3 illustrates an example implementation in which the font modification system of FIG. 1 generates a font descriptor for a font in a machine learning environment.

FIG. 3 illustrates an example machine learning environment 300 in which a machine learning system 302 generates a font visual similarity model 304. The font visual similarity model 304 is representative of functionality that can be implemented by the local font descriptor module 118 to generate a local font descriptor 204 given a font image 306, such as a font image for one of the local fonts 202 illustrated in FIG. 2. In the illustrated environment, a set of training font images 308 are input to the machine learning system 302 and processed to generate the font visual similarity model 304. The training font images 308 include images of text rendered using different fonts. In some implementations, the machine learning system 302 is implemented using multiple columns 310. Each of the columns 310 processes a rendered glyph as an instance of the text for a particular font. The columns 310 include an anchor image column 310-1, a positive image column 310-2, and a negative image column 310-3.

The anchor image column 310-1 is provided with an anchor image including at least one glyph rendered using a given font type. The positive image column 310-2 is provided with a positive image including at least one glyph derived from the given font type. For example, the positive image glyph may be the same glyph as the anchor glyph with a perturbation (e.g., a rotation) or a different glyph from the same given font type. The negative image column 310-3 is provided with a negative image including at least one glyph rendered using a particular font type that differs from the given font type. Different training font images 308 may be input to the machine learning system 302 and iterated until the machine learning system 302 converges to generate the font visual similarity model 304.

Some machine learning systems operate with multiple layers. Artificial neural networks, for example, have multiple neuron–like nodes that are organized into multiple layers. In example embodiments, the font visual similarity model 304 includes multiple nodes 314 that are coupled to one another via one or more connections 312. The nodes 314 are organized into multiple layers 316. Multiple layers 316-1, 316-2 . . . 316-(n-2), 316-(n-1), 316-n are shown. The multiple layers 316 include an initial or input layer 316-1, a final or output layer 316-n, and multiple internal layers 316-2 to 316-(n-1). Each node 314 corresponds to an activity, and each connection 312 corresponds to a weight. During the iterations of the training to generate the font visual similarity model 304, the weights or the activities are adjusted to achieve a convergence.

In an example operation for computing a local font descriptor 112, a font image 306 for a local font 202 is input to the font visual similarity model 304. The font image 308 can be an image of one or more glyphs that are rendered in accordance with a given font to represent a visual appearance of the given font. The font image 308 is provided to the input layer 316-1. The corresponding local font descriptor 204 is extracted or output from the nodal values of an internal layer, such as the layer 316-(n-2) or the layer 316-(n-1). The local font descriptor 204 includes multiple font attributes 318 that are derived from the visual appearance of the font image 306. The font attributes 318 can respectively correspond to, for example, values of nodes 314 of the layer 316 from which the local font descriptor 204 is extracted. By way of example, two font images 306 can be input to the font visual similarity model 304. One font image 306 may include uppercase glyphs for a font while the other font image 306 includes lowercase glyphs for the font. The font attributes 318 for the uppercase and lowercase font images 306 are then concatenated to form the local font descriptor 204 for the font. In this manner, the font attributes 318 are representative of font properties that are useable to define a font's appearance.

As an example, font attributes 318 may include a "StemV" attribute, which describes a horizontal thickness of dominant vertical stems of glyphs in the source font 108. Additionally or alternatively, the font attributes 318 may include a "StemH" attribute, which describes a vertical thickness of dominant horizontal stems of glyphs in the source font 108. Alternatively or additionally, the font attributes 318 may include an "xHeight" attribute, which describes a height of a lower case Latin letter (e.g., "x") measured from a baseline for the font. Alternatively or additionally, the font attributes 318 may include a "CapHeight" attribute, which describes a height of an upper case, or capital, Latin letter (e.g., "X") measured from a baseline for the font. Alternatively or additionally, the font attributes 318 may include an "Ascent" attribute, which describes a maximum height above a baseline for the font to which glyphs of the font may extend. Alternatively or additionally, the font attributes 318 may include a "Descent" attribute, which describes a maximum depth below a baseline for the font to which glyphs of the font may extend. Alternatively or additionally, the font attributes 318 may include an "ItalicAngle" attribute, which describes an angle expressed in degrees counterclockwise from a vertical axis of dominant vertical strokes of the font. Alternatively or additionally, the font attributes 318 may include a "Widths" attribute, which describes an array of widths of glyphs of the font as used in a document, such as in the electronic document 106 illustrated in FIG. 1.

Thus, by leveraging the font visual similarity model 304, the local font descriptor module 118 is configured to generate a local font descriptor 204 for a local font 202. In some implementations, the local font descriptor module 118 may be implemented by the different computing device 114 and used to generate the font descriptor 112 for the source font 108 of the electronic document 106.

Figure 4:
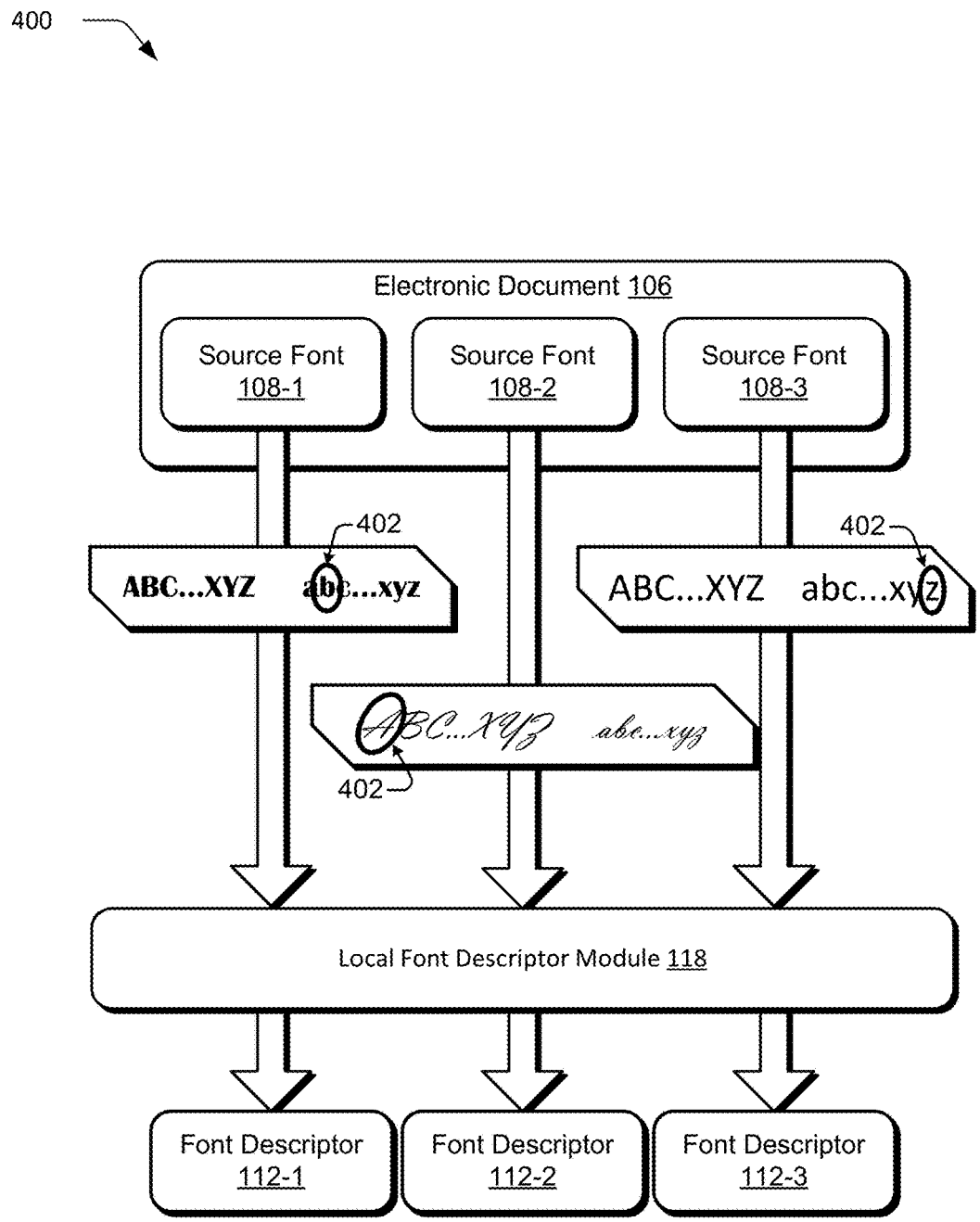
FIG. 4 illustrates an example implementation in which the font modification system of FIG. 1 generates different font descriptors for different fonts of an electronic document.

FIG. 4 illustrates an example implementation of the local font descriptor module 118 generating different font descriptors 112 for different source fonts 108 included in the electronic document 106. In the illustrated example, the electronic document 106 includes three source fonts 108-1, 108-2, and 108-3. Alternatively, more or fewer than three source fonts 108 can be included in the electronic document 106. Each source font 108 corresponds to a font image 306 that includes multiple glyphs 402 that are rendered in accordance with the corresponding source font 108. To create the font images 306, the rendering module 124 may generate a bitmapped file representing a visual appearance of the corresponding source font 108.

Each font image 306 is input into the font visual similarity model 304, as implemented by the local font descriptor module 118. The font visual similarity model 304 then outputs respective font descriptors 112 based on the visual appearance of the corresponding source font 108, as realized by the respective font images 306. Thus, font descriptor 112-1 corresponds to the source font 108-1, font descriptor 112-2 corresponds to the source font 108-2, and font descriptor 112-3 corresponds to the source font 108-3. After generating the font descriptors 112, the local font descriptor module 118 is configured to append the font descriptors 112 to the electronic document 106 as being associated with the respective source fonts 108.

In some implementations, the local font descriptor module 118 generates a font descriptor 112 for a source font 108 using the font visual similarity model 304 each time an electronic document 106 is finalized or being prepared for transmission from the different computing device 114 to the computing device 102. Alternatively or additionally, the local font descriptor module 118 determines a font descriptor 112 for a source font 108 by accessing a data structure, such as a font descriptor-to-font database. To produce such a font descriptor-to-font database, the local font descriptor module 118 establishes an association between a source font 108 and a corresponding font descriptor 112. The association can be created and stored on-demand as electronic documents 106 are prepared for transmission or preemptively (e.g., pre-computed) prior to generation of an electronic document 106.

Although described herein with respect to generating the font descriptor 112 for the source font 108 on the different computing device 114, the same functionality may be leveraged by the local font descriptor module 118 implemented on the computing device 102 to generate local font descriptors 204 for local fonts 202 that are available to the computing device 102. In this manner, the techniques described herein are useable to generate a font descriptor 112 for a source font 108 as well as a local font descriptor 204 for a local font 202. Given a font descriptor 112 and a plurality of local font descriptors 204, the font similarity module 120 is configured to generate a list of ranked local font descriptors 206, which orders the local font descriptors 204 based on their visual similarity to the source font 108, as indicated by respective font attributes, such as font attributes 318, as illustrated in FIG. 3.

Figure 5:
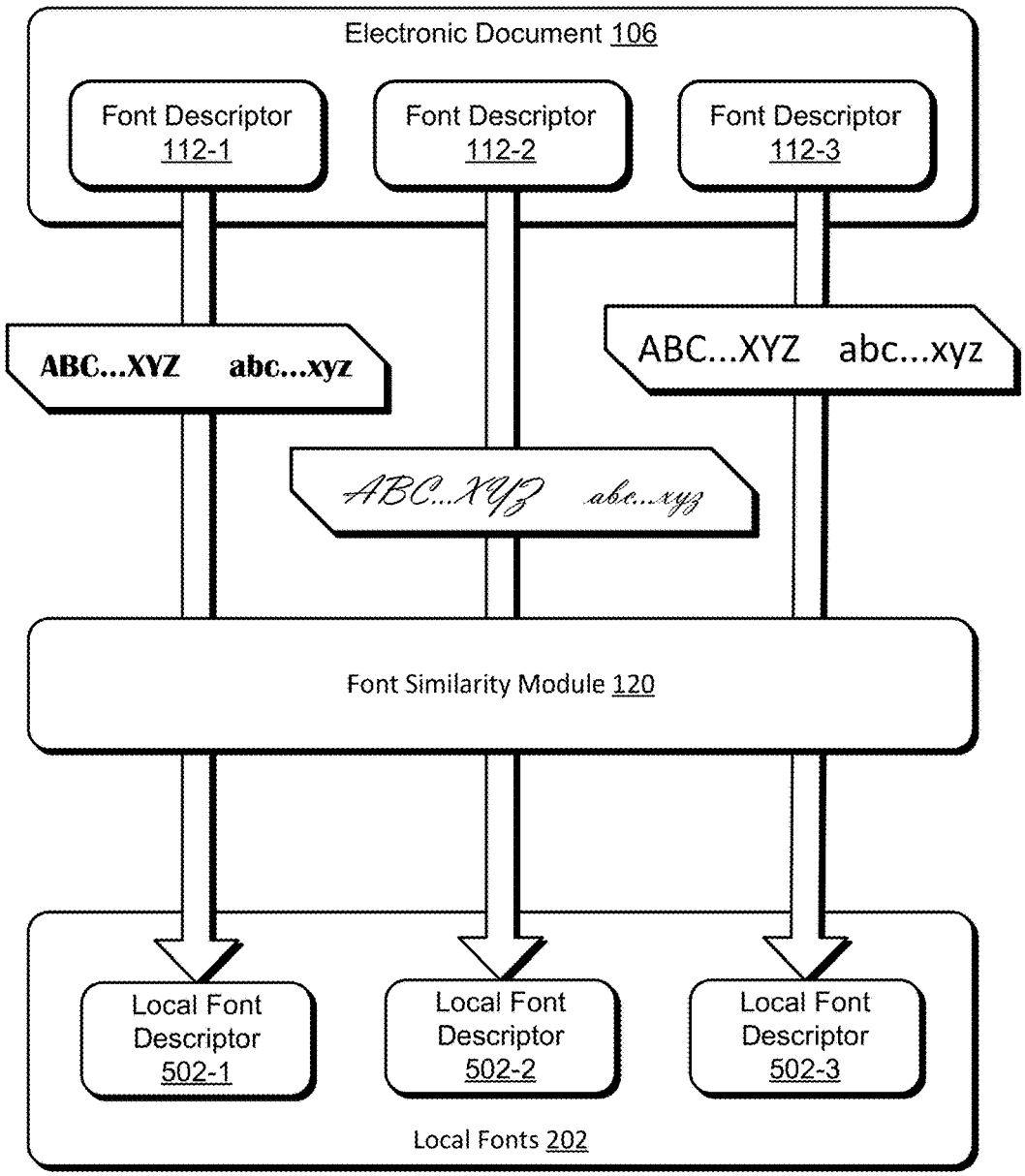
FIG. 5 illustrates an example implementation in which the font modification system of FIG. 1 identifies at least one similar font based on a font descriptor.

FIG. 5 illustrates an example implementation 500 in which the font similarity module 120 of the font modification system 104 identifies one or more local fonts 202 that are visually similar to the source font 108 of the electronic document 106. The font similarity module 120 receives at least one font descriptor 112, such as font descriptors 112-1, 112-2, and 112-3, representative of three different fonts included in the electronic document 106.

To identify local fonts 202 that are visually similar to the source font 108, the font similarity module 120 compares the font descriptors 112 against local font descriptors 502, which are representative of local font descriptors 204, as illustrated in FIG. 2. For each local font descriptor 204, respective distances between the font descriptor and the font descriptor 112 for the source font 108 are calculated. The distances can comprise semantic distances indicative of how similar or not similar the visual appearances of two fonts are as captured by the respective font descriptors 112. One or more of the smaller or smallest distances are ascertained.

The font similarity module 120 then determines local font descriptors 502 that are most visually similar to the font descriptors 112 based on these ascertained distances. For instance, a font descriptor for a local font 202 having the smallest distance from the font descriptor 112-1 can be ascertained as local font descriptor 502-1, which corresponds to the local font 202 that is most visually similar to the source font 108 identified by the font descriptor 112-1. In a similar manner, the local font descriptor 502-2 corresponds to a local font 202 that is most visually similar to a source font 108 identified by the font descriptor 112-2, and the local font descriptor 502-3 corresponds to a local font 202 that is most visually similar to a source font 108 identified by the font descriptor 112-3.

The ranked local font descriptors 206, as illustrated in FIG. 2, are thus representative of an ordered list of local font descriptors 204 based on their calculated distances to the font descriptor 112. The ranked local font descriptors 206 may include any number of local font descriptors 204. For instance, the font similarity module 120 can generate ranked local font descriptors 206 to include n local font descriptors 204, where n represents any integer.

A top-ranked local font descriptor may be automatically selected by the font synthesis module 122, may be selected by a user of the computing device implementing the font modification system, or combinations thereof as the local font 202 to be used in generating the synthesized font 208. By selecting a local font 202 that is visually similar to the source font 108, the font modification system 104 reduces a number of glyph modifications to be performed in generating the synthesized font 208 in a manner that maintains a consistent appearance with an original design layout for the electronic document. Before considering various modifications that may be applied to a local font 202 to generate the synthesized font 208, consider an example of a glyph outline that may be modified to generate the synthesized font 208.

FIG. 6 illustrates an example implementation 600 of a glyph outline for a font, as represented by various segments and associated directions. The illustrated example includes a glyph 602 and a representation 604 of the glyph 602 as segments having directions. In accordance with one or more implementations, the representation 604 is a closed Bezier path of an outline, denoted as points P1-P12. In some implementations, points P1-P12 may be expressed as:

$$P=[x,y]$$

where: P represents each point; x is an x-coordinate of the point; and y is a y-coordinate of the point.

In another implementation, the glyph 602 can be represented by one or more segments as:

$$S=[p0,p1]$$

where: S represents each segment; p0 is a starting point of the segment; and p1 is an endpoint of the segment. Additionally, each segment may be a line segment or a curve segment so for each S if p0 and p1 are connected by a line, then S is a line segment; and if p0 and p1 are connected by a curve, then S is a curve segment.

In another implementation, a direction of each segment may be expressed as:

$$Up: [p0.y<p1.y \text{ and } p0.x==p1.x]$$

$$Down: [p0.y>p1.y \text{ and } p0.x==p1.x]$$

$$Left: [p0.x>p1.x \text{ and } p0.y==p1.y]$$

$$Right: [p0.x<p1.x \text{ and } p0.y==p1.y]$$

$$LeftUp: [p0.x>p1.x \text{ and } p0.y<p1.y]$$

$$RightUp: [p0.x<p1.x \text{ and } p0.y<p1.y]$$

$$LeftDown: [p0.x>p1.x \text{ and } p0.y>p1.y]$$

$$RightDown: [p0.x<p1.x \text{ and } p0.y>p1.y]$$

where: p0.x is the x-coordinate of the start point of the segment; p0.y is the y-coordinate of the start point of the segment; p1.x is the x-coordinate of the endpoint of the segment; and p1.y is the y-coordinate of the endpoint of the segment.

In an example, the outline of the glyph 402 can be expressed as segments with directions as follows:
LineSegment[P1,P2]: Down
LineSegment[P2,P3]: Right
LineSegment [P3,P4]: Up
LineSegment[P4,P5]: Left
LineSegment[P5,P6]: Up
LineSegment[P6,P7]: Right
LineSegment[P7,P8]: Up
LineSegment [P8,P9]: Left LineSegment[P9,P10]: Up
LineSegment[P10,P11]: Right
LineSegment[P11,P12]: Up
LineSegment[P12,P1]: Left By representing glyph 602 using the representation 604, the glyph segments and their directions can be leveraged by the font synthesis module 122 to modify outlines of various glyphs to generate a synthesized font 116 having a visually similar appearance to source font 108. Glyph modifications that may be performed by the font synthesis module 122 are illustrated and described in further detail below with respect to FIGS. 7A-23.

Horizontal Weight Modification

Figure 7A:
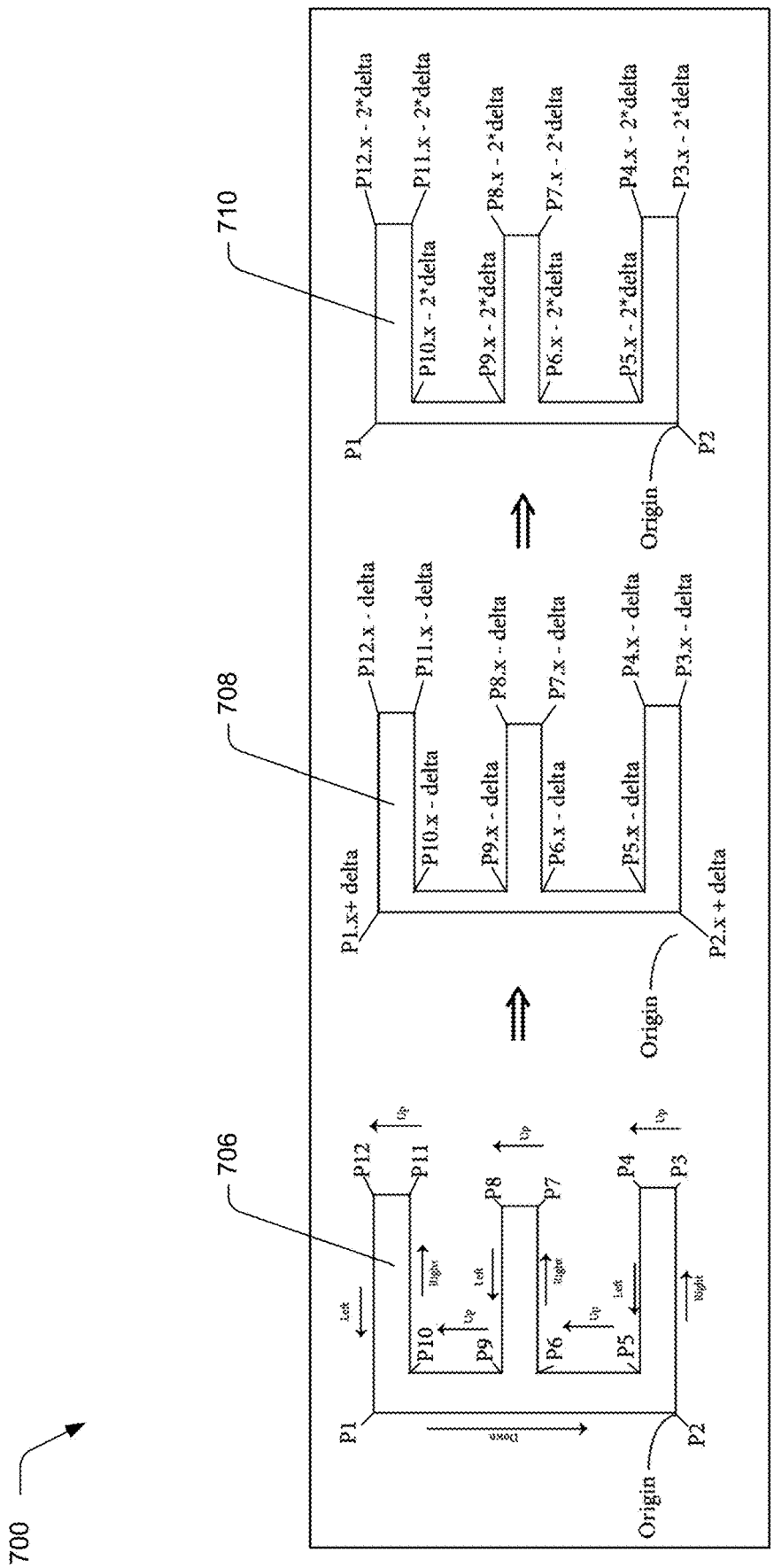
FIGS. 7A-7C illustrate example implementations in which the font modification system of FIG. 1 synthesizes font by modifying the font's horizontal weight.
Figure 7B:
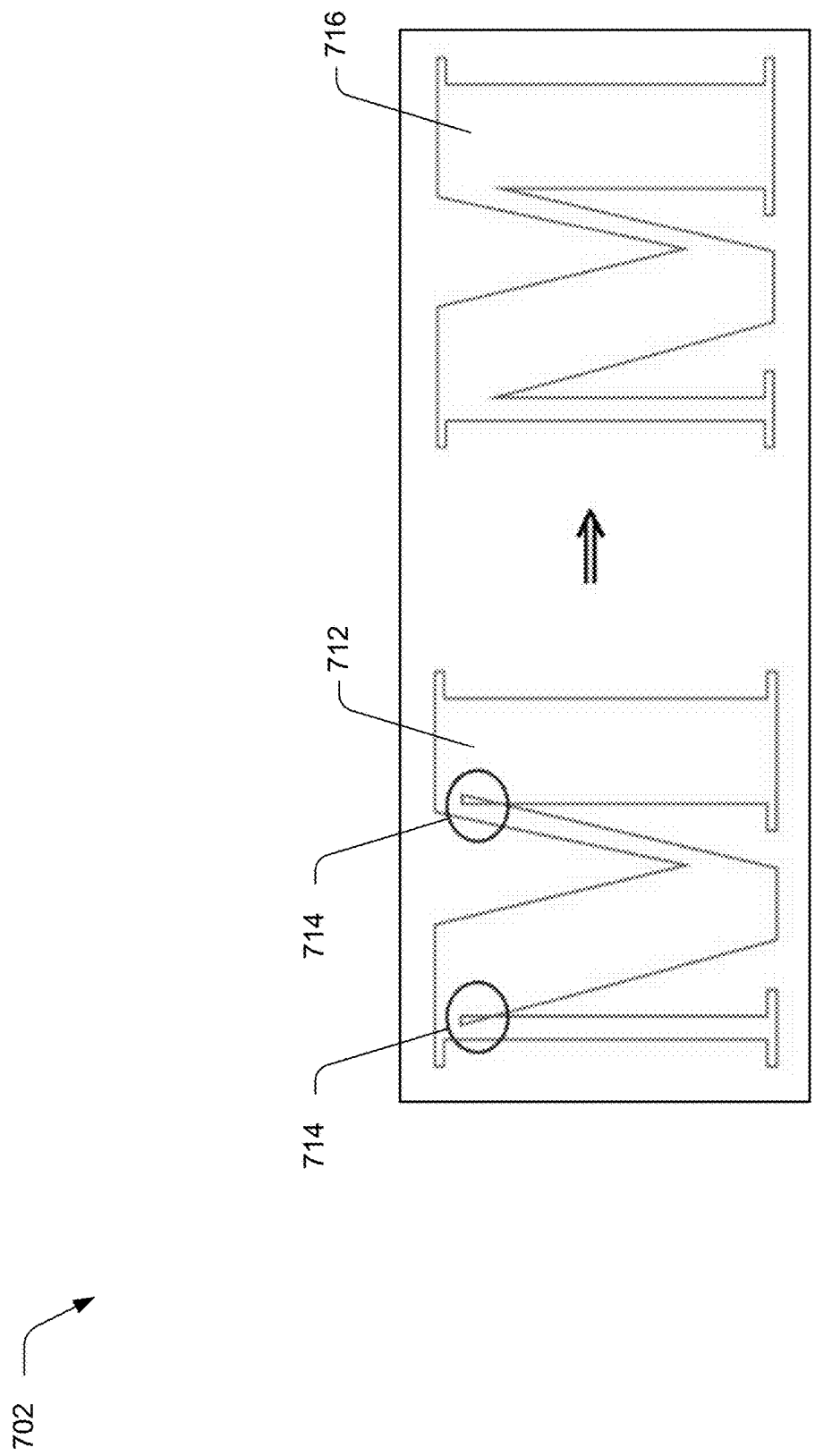
Figure 7C:
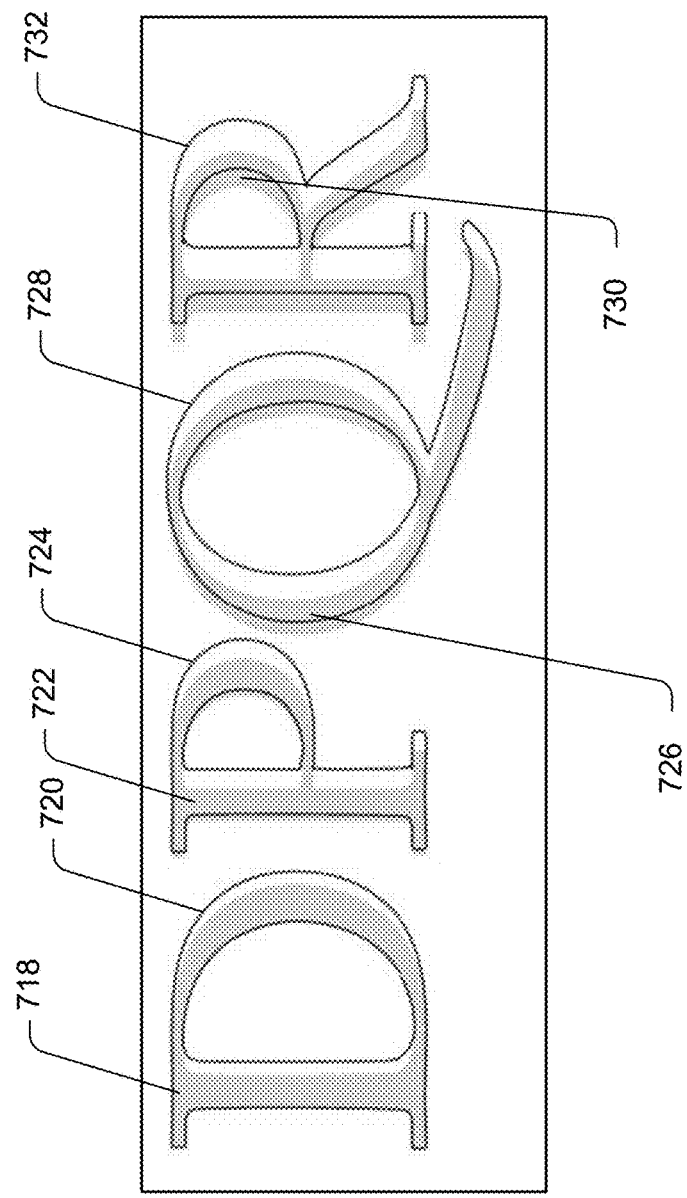

FIGS. 7A-7C illustrate example implementations of generating synthesized font by modifying horizontal glyph weights. As described herein, modifying horizontal glyph weights refers to changing a thickness of vertical stems of a glyph. In one example, this may be accomplished by leveraging segment directions and common points of segments such as those illustrated in the representation 604 of the glyph 602.

In some implementations, the font descriptor 112 for the source font 108 may include a horizontal weight font attribute to be used as a target value for modifying a local font 202 to obtain synthesized font 116. Such a horizontal weight attribute may quantify an amount by which to modify a glyph's horizontal weight, which may be expressed as a percentage of a stroke width of a vertical stem of an unmodified glyph, such that a positive percentage corresponds to an increase in the stroke width of the vertical stem and a negative percentage corresponds to a decrease in the stroke width of the vertical stem.

A modification value for the vertical stem may be expressed as:

$$\text{delta} = \frac{[(\text{modified stroke width}) - (\text{original stroke width})]}{2} \quad (\text{Eq. 3})$$

where: delta is a value to add to both sides of the vertical stem to modify the horizontal weight of the vertical stem; original stroke width is the stroke width of the vertical stem of the unmodified glyph; and modified stroke width is the stroke width of the vertical stem after applying a percentage increase or decrease to the original stroke width.

In some implementations, the font modification system 104 may apply the delta value to an outline of an unmodified glyph for a local font 202 based on directions of segments that constitute the outline of the unmodified glyph. For instance, the font synthesis module 122 may apply the delta value to coordinates of points of segments representing a glyph outline based on directions of glyph segments connected to the points. As illustrated in FIG. 6, each of the points P1-P12 belongs to at least two segments, and the font synthesis module 122 can apply the delta value to coordinates of the points P1-P12 based on directions of the segments having the points P1-P12. Because each of the points P1-P12 in the illustrated example of FIG. 6 represents a starting point of a first segment and an ending point of a second segment, the font synthesis module 122 may determine an application of the delta value to the coordinates of the points P1-P12 based on a current segment and a next segment. In this manner, any particular point of the points P1-P12 represents an endpoint of a current segment and a start point of a next segment.

For example, the font synthesis module 122 can determine whether a current segment's direction is Up, LeftUp, or RightUp. In response to determining that the current segment's direction is Up, LeftUp, or RightUp, the font synthesis module 122 may determine whether a direction of the next segment is Up, LeftUp, RightUp, Left, or Right. If the current segment's direction is Up, LeftUp, or RightUp, and if the next segment's direction is Up, LeftUp, RightUp, Left, or Right, then the font synthesis module 122 may apply the delta value to a common point of the current segment and the next segment by adding the delta value to an x-coordinate of the common point. In other words, if the current segment's direction is Up, LeftUp, or RightUp, and if the next segment's direction is Up, LeftUp, RightUp, Left, or Right, then the font synthesis module 122 may add the delta value to an x-coordinate of a point which is the endpoint of the current segment and the start point of the next segment.

In an example implementation, if the current segment's direction is Up, LeftUp, or RightUp, and if the next segment's direction is Down, LeftDown, or RightDown, then the font synthesis module 122 may prevent a segment from overlapping another segment of the segments representing the outline of an unmodified glyph. For example, in implementations where consecutive segments have opposite directions or opposite direction components, a delta value may be added to a first segment and the delta value will be subtracted from a second segment, thereby overlapping the segments. In other words, the effect of the application of the delta value can cause the first segment and the second segment to shift in opposing directions, and because the first segment and the second segment are consecutive segments, this scenario can create overlaps or kinks in an outline of a modified glyph. To avoid this, the font synthesis module 122 can be implemented to use the theorem of intersecting lines which is also referred to as the intercept theorem to identify a point at which the first segment and the second segment intersect. In this manner, the font synthesis module 122 may change a y-coordinate of a common point between the first segment and the second segment based on the identified point at which the first segment and the second segment intersect to prevent the overlaps or kinks.

In some implementations, the font synthesis module 122 may determine whether a current segment's direction is Down, LeftDown, or RightDown. Responsive to determining that the current segment's direction is Down, LeftDown, or RightDown, the font synthesis module 122 may determine whether a direction of a next segment is Down, LeftDown, RightDown, Left, or Right. If the current segment's direction is Down, LeftDown, or RightDown, and if the next segment's direction is Down, LeftDown, RightDown, Left, or Right, then the font synthesis module 122 may apply the delta value to a common point of the current segment and the next segment by subtracting the delta value from an x-coordinate of the common point.

FIG. 7A illustrates an example implementation 700 of an unmodified glyph 706 for a local font 202 as well as a modified glyph 708, which has a reduced horizontal weight relative to the unmodified glyph 706. In the illustrated example, a delta value has been added to x-coordinates of points P1 and P2, which causes the vertical stem of the modified glyph 708 to shift along the x-axis by the delta value. The illustrated example further includes a modified glyph 710 having a changed origin to maintain a common origin with the unmodified glyph 706.

FIG. 7B illustrates an example implementation 702 of a modified glyph 712 that includes segment overlaps 714, which may result from modifying horizontal glyph weights to achieve synthesized font 116. To maintain typographical accuracy, the font synthesis module 122 is configured to remove these overlaps 714 using the theorem of intersecting lines and identify a point in which the segments of the modified glyph 712 intersect. In response to identifying such a point, the font synthesis module 122 is configured to change y-coordinates of respective glyph points to remove the overlaps 714. Removal of the overlaps 714 results in the modified glyph without overlaps 716.

FIG. 7C illustrates an example implementation 704 of modified glyphs having an increased horizontal weight relative to unmodified glyphs of a local font 202. In the illustrated example, the horizontal weights of a first original glyph 718 are increased to generate a first modified glyph 720, where the shaded area represents the horizontal weight of the first original glyph 718 and the solid outline represents the resulting horizontal weight of the first modified glyph 720. The illustrated example further includes a second original glyph 722, the horizontal weight of which has been modified to generate the second modified glyph 724. The illustrated example further includes a third original glyph 726 and a second modified glyph 728, which results from modifying the horizontal weight of the third original glyph 726. Finally, the illustrated example includes a fourth original glyph 730 and a fourth modified glyph 732.

In the illustrated example, progressing from left to right, the modified glyphs are increasingly shifted relative to their respective original glyphs due to increased advanced width. Thus, in generating the synthesized font 116, the font synthesis module 122 is not limited to modifying each glyph of a local font 202 in a consistent manner. In some implementations, the font synthesis module 122 is configured to modify glyphs of a local font 202 on an individual basis. Alternatively or additionally, the font synthesis module 122 may modify glyphs of a local font 202 on a per-line basis, such that each line of the source font 108 is modified on a separate basis to preserve an original design layout of the electronic document 106.

Figure 8:
FIG. 8 illustrates an example implementation in which the font modification system of FIG. 1 synthesizes font by modifying the font's horizontal weight.

FIG. 8 illustrates various examples 800 of generating synthesized font using horizontal weight modifications. The illustrated examples 800 include example representation 802, which is representative of glyphs of a local font 202 having no horizontal weight modifications. Example representation 804 illustrates glyphs of the local font 202 as modified by decreasing horizontal weight font attributes, such as a 20% decrease of the local font 202's horizontal weight. As a result of the decreased horizontal weight, vertical stems of glyphs in the example representation 804 have a decreased thickness relative to vertical stems of glyphs of the example representation 802. The illustrated example further includes example representation 806, which illustrates glyphs of the example representation 802 as being modified with an increased horizontal weight, such as a 25% increase. As a result, vertical stems of the example representation 806 have an increased thickness relative to vertical stems of the example representation 802. Having considered examples of generating synthesized font by modifying horizontal stems of font glyphs, consider now examples of generating synthesized font by modifying vertical stems of font glyphs.

Vertical Weight Modifications

FIG. 9 illustrates an example implementation 900 of generating synthesized font by modifying vertical weights of font glyphs. In the illustrated example, unmodified glyph 902 represents an unmodified glyph of a local font 202 that is available for use by the computing device implementing the font modification system 104. In an implementation where the font synthesis module 122 determines that font attributes of the source font 108 indicate different vertical thicknesses of vertical glyph stems relative to glyphs of the local font 202, the font synthesis module 122 may leverage the font attributes to determine an amount by which to modify vertical weights of the local font 202.

In some implementations, the amount by which the local font 202 is to be modified may be quantified as a percentage of a stroke height of a horizontal stem of the unmodified glyph 902, such that a that a positive percentage corresponds to an increase in the stroke height of the horizontal stem and a negative percentage corresponds to a decrease in the stroke height of the horizontal stem. A modification value for the horizontal stem may be expressed as:

$$\text{delta} = \frac{[(\text{modified stroke height}) - (\text{original stroke height})]}{2} \quad \text{(Eq. 4)}$$

where: delta is a value to add to the top and bottom of the horizontal stem to modify the vertical weight of the horizontal stem; original stroke height is the stroke height of the horizontal stem of the unmodified glyph 902; and modified stroke height is the stroke height of the horizontal stem after applying a percentage increase or decrease to the original stroke height.

The font synthesis module 122 may apply the delta value to an outline of the unmodified glyph 902 based on directions of segments representing the outline of the unmodified glyph 902. For instance, the font synthesis module 122 may apply the delta value to coordinates of points of segments representing the outline of the unmodified glyph 902 based on directions of the segments connected to the points. As illustrated in FIG. 6, each of the points P1-P12 belongs to at least two segments, and the font synthesis module 122 can apply the delta value to coordinates of the points P1-P12 based on directions of the segments having the points P1-P12. Since each of the points P1-P12 in this example represents a starting point of a first segment and an ending point of a second segment, the font synthesis module 122 may determine an application of the delta value to the coordinates of the points P1-P12 based on a current segment and a next segment.

In this manner, the font synthesis module 122 may apply the delta value to points of the unmodified glyph 902 to increase or decrease a thickness of the glyph's horizontal stems, which may result in a modified glyph having an increased vertical weight 904 or a modified glyph having a decreased vertical weight 906. In the illustrated example, the modified glyph having increased vertical weight 904 has thicker horizontal stems than the unmodified glyph 902 and the modified glyph having decreased vertical weight 906 has thinner horizontal stems relative to the unmodified glyph 902.

Figure 10:
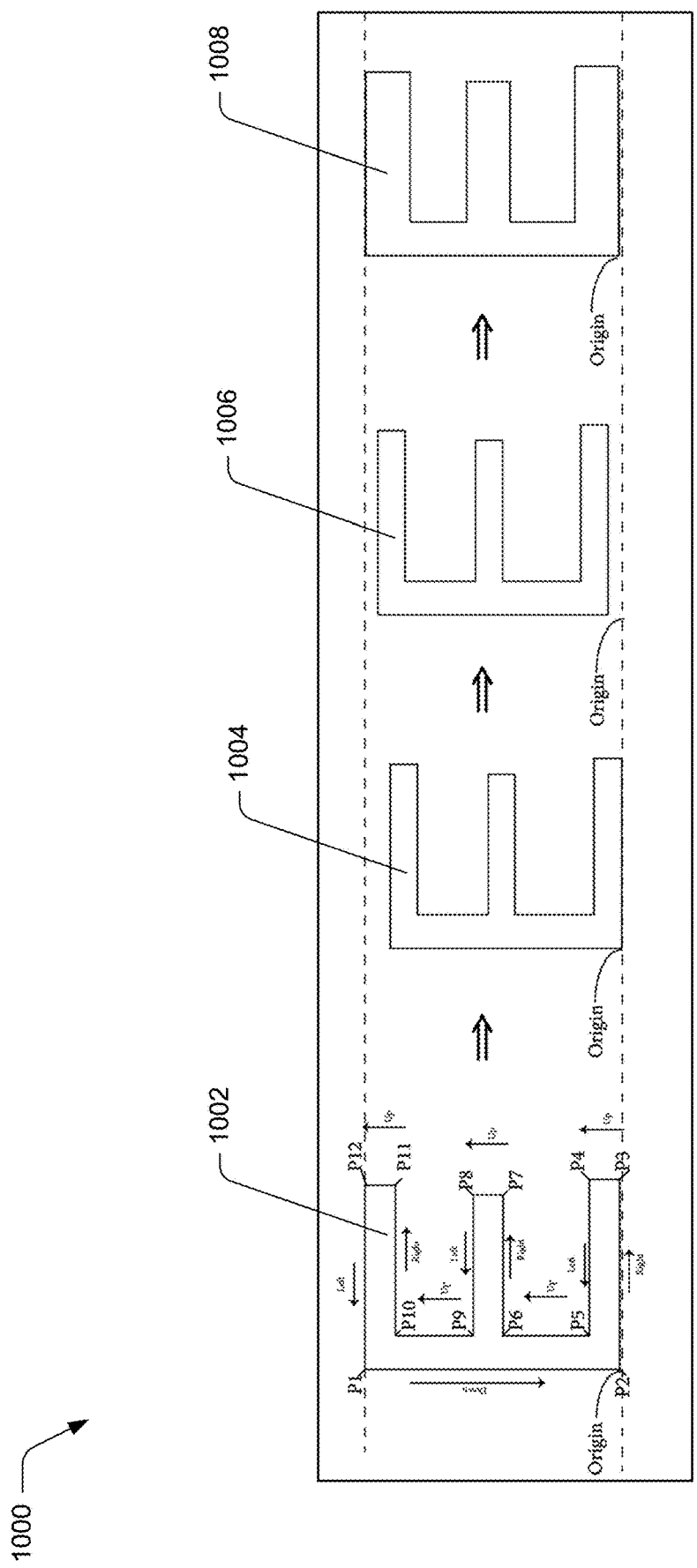
FIG. 10 illustrates an example implementation in which the font modification system of FIG. 1 synthesizes font by maintaining the font's origin and modifying the font's vertical weight.

FIG. 10 illustrates an example implementation 1000 of generating synthesized font by modifying the font's vertical weight while accounting for a glyph's origin. In some implementations, modifying a glyph's vertical weight results in a change to the glyph's position relative to a baseline for the line of font in which the glyph is included. For example, increasing a vertical weight of the glyph can increase the height of the glyph's bounding box whereas decreasing a vertical weight of the glyph may decrease the height of the glyph's bounding box. The illustrated example includes an unmodified glyph 1002 which is represented as segments having directions. In order to maintain a baseline and a bounding box height of the unmodified glyph 1002, the font synthesis module 122 may be implemented to scale the unmodified glyph 1002 in a vertical direction by two times the delta value which is illustrated as resulting in a scaled glyph 1004.

In the illustrated example, the scaled glyph 1004 has been downscaled by two times the delta value which decreases a height of a bounding box of the scaled glyph 1004 relative to the unmodified glyph 1002. In one example, downscaling the unmodified glyph 1002 may be performed by the font synthesis module 122 as part of increasing a vertical weight of the unmodified glyph 1002. In another example, the font synthesis module 122 may be implemented to upscale the unmodified glyph 1002 by two times the delta value as part of decreasing a vertical weight of the unmodified glyph 1002.

In the illustrated example, the scaled glyph 1004 is shifted away from the baseline at which the origin of unmodified glyph 1002 is located, which may result in synthesized font that has a common vertical weight attribute to a source font but looks visually dissimilar to the source font due to the shift away from the baseline. To maintain visual similarity with the source font, the font synthesis module 122 is configured to shift the scaled glyph 1004 such that the shifted glyph is disposed at a certain distance from the baseline. For instance, the font synthesis module 122 may shift the scaled glyph 1004 to generate a shifted glyph 1006 that is positioned at a common distance relative to both the baseline and a maximum height above the baseline (e.g., the upper limit of the bounding box for the unmodified glyph 1002). In this manner, the font synthesis module is configured to position the shifted glyph 1006 such that increasing a thickness of horizontal stems of the shifted glyph 1006 by the delta value on the top and bottom of the horizontal stems will result in the shifted glyph 1006 having a baseline and a maximum height above the baseline in common with the unmodified glyph 1002.

By modifying the vertical weights of glyphs in this manner, the font synthesis module 122 is configured to maintain an origin and bounding box associated with the unmodified glyph 1002, thereby ensuring a resulting visual similarity in an example scenario where a local font was selected for synthesis based on having attributes indicating baseline and bounding box values similar to a source font to be emulated. In a similar manner, the font synthesis module 122 is configured to generate synthesized font 116 by decreasing a vertical weight of the unmodified glyph 1002. To do so, the font synthesis module 122 may upscale the unmodified glyph 1002 in the vertical direction by twice the delta value and shift the upscaled glyph by the delta value such that the scaled glyph is disposed at a distance equal to the delta value from the height of the unmodified glyph 1002's bounding box. In an example implementation, the font synthesis module 122 may decrease the vertical weight of a font by adding the delta value to points of the segments based on segment directions and subtracting the delta value from points of the segments based on the segment directions.

Figure 11:
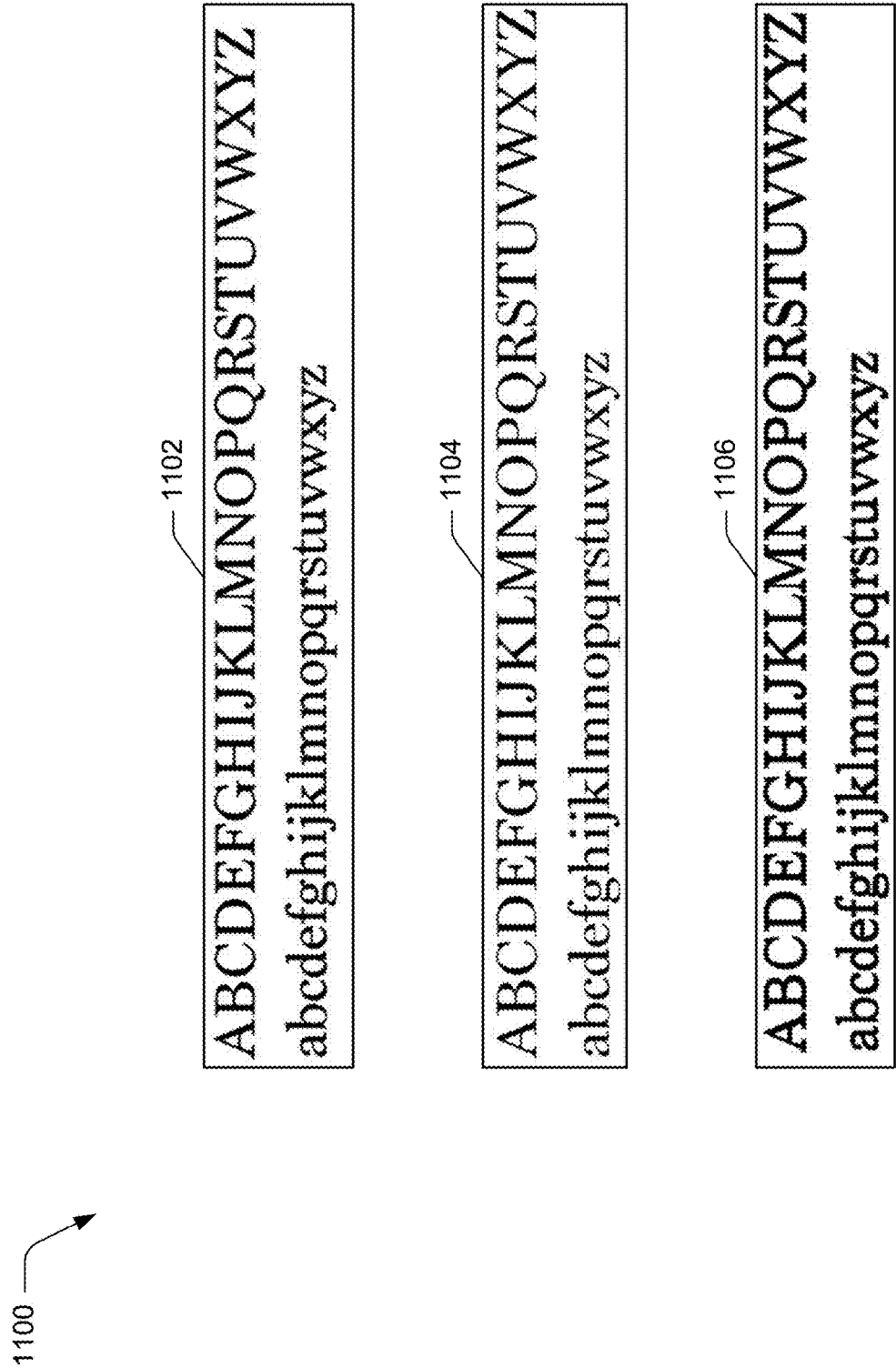
FIG. 11 illustrates an example implementation in which the font modification system of FIG. 1 synthesizes font by modifying the font's vertical weight.

FIG. 11 illustrates an example implementation 1100 of generating synthesized font by modifying vertical weight font attributes. The illustrated example includes example representation 1102, which illustrates glyphs having no vertical weight modification, such as original glyphs of a local font 202. Example representation 1104 illustrates the glyphs of representation 1102 as having decreased vertical weight, such as a decrease of the vertical weight font attribute by 20%. In the illustrated example, horizontal stems of glyphs in the example representation 1104 have decreased thickness relative to horizontal stems of the original glyphs as illustrated in example representation 1102. Example representation 1106 illustrates the original glyphs of example representation 1102 as having increased vertical weight, such as an increase of the vertical weight font attribute by 30%. Thus, the font synthesis module 122 is configured to modify vertical weight attributes in generating synthesized font 116. Having considered example implementations of generating synthesized font by modifying vertical weight attributes, consider now examples of generating synthesized font by modifying overall font weight.

Overall Weight Modification

Figure 12:
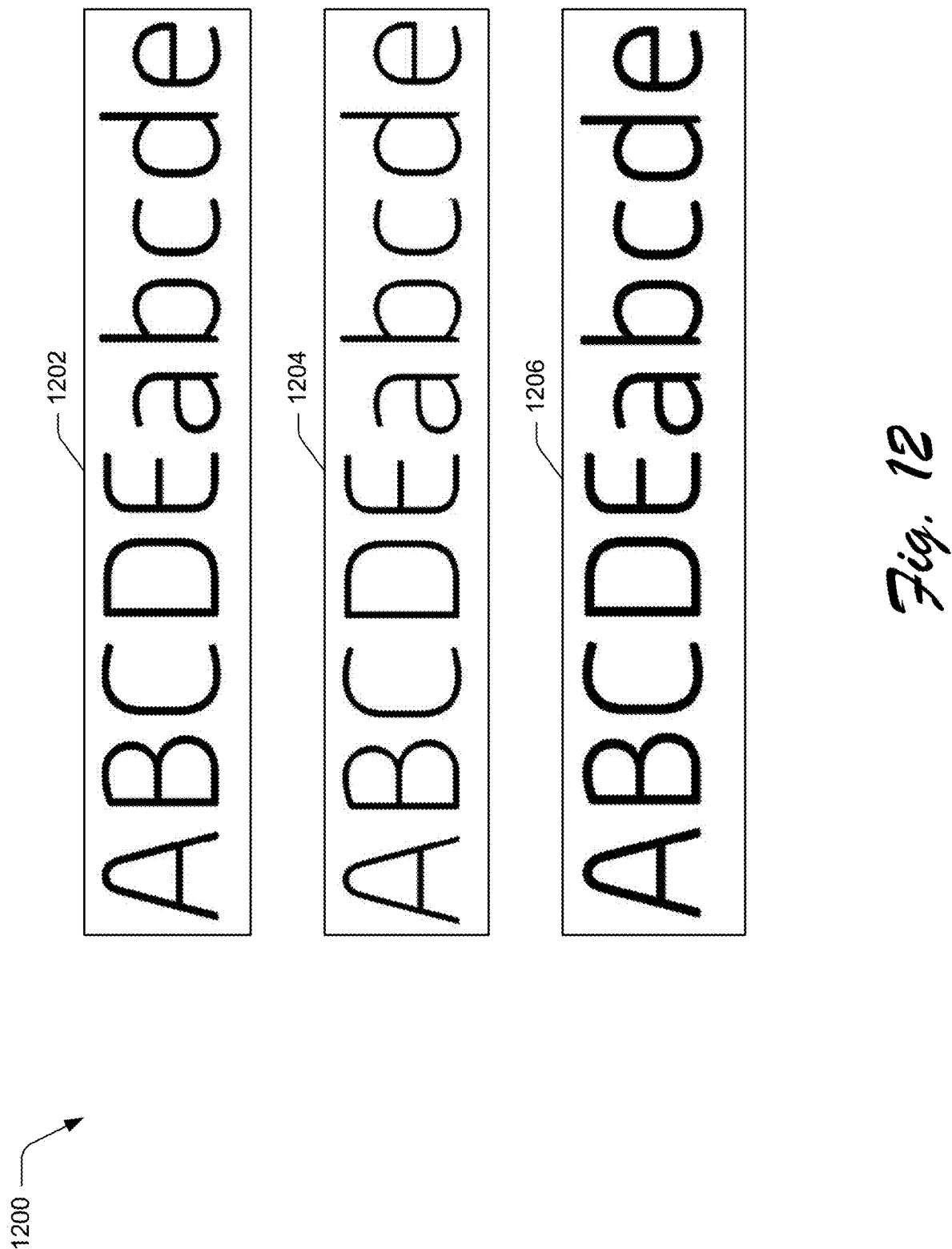
FIG. 12 illustrates an example implementation in which the font modification system of FIG. 1 synthesizes font by modifying the font's overall weight.

FIG. 12 illustrates an example implementation 1200 of generating synthesized font using overall font weight modifications. By representing a font glyph as segments having directions as indicated in FIG. 6, the font synthesis module 122 is configured to modify a glyph's horizontal weight and vertical weight simultaneously. For instance, the font synthesis module 122 can modify a glyph's overall weight by increasing or decreasing the glyph's horizontal weight and also by increasing or decreasing the glyph's vertical weight. The illustrated example of FIG. 12 includes a representation 1202, which exemplifies glyphs of a local font 202 prior to modification by the font synthesis module 122. Representation 1204 illustrates the glyphs of representation 1202 as having a decreased overall weight, such as a 20% reduction in a font attribute indicating overall glyph weight. Such a reduction in overall weight may correspond to equal parts reduction in both the horizontal and vertical weights for the font. For instance, representation 1204 illustrates the glyphs of representation 1202 as having a 20% reduction in vertical weight as well as a 20% reduction in horizontal weight, In a similar manner, representation 1206 illustrates the glyphs of representation 1202 as having an increased overall weight, such as a 20% increase in overall glyph weight. Thus, representation 1206 illustrates the glyphs of representation 10202 as being increased in both horizontal and vertical weights by 20%, respectively. Although overall weight modification has been described with respect to equal modifications of horizontal weights and vertical weights, the font synthesis module 122 is configured to modify overall glyph weight in a manner that does not modify horizontal and vertical weights equally. For instance, the font synthesis module 122 may increase a vertical weight by 20% while increasing a horizontal weight by 10%. In this manner, overall weight modifications may refer to the altering of horizontal weights by m % and vertical weights by n %, where m and n refer to any value between negative one hundred and one hundred, inclusive. Having considered example implementations of generating synthesized font by modifying overall font weight, consider now examples of generating synthesized font by modifying font width attributes.

Width Attribute Modification

Figure 13:
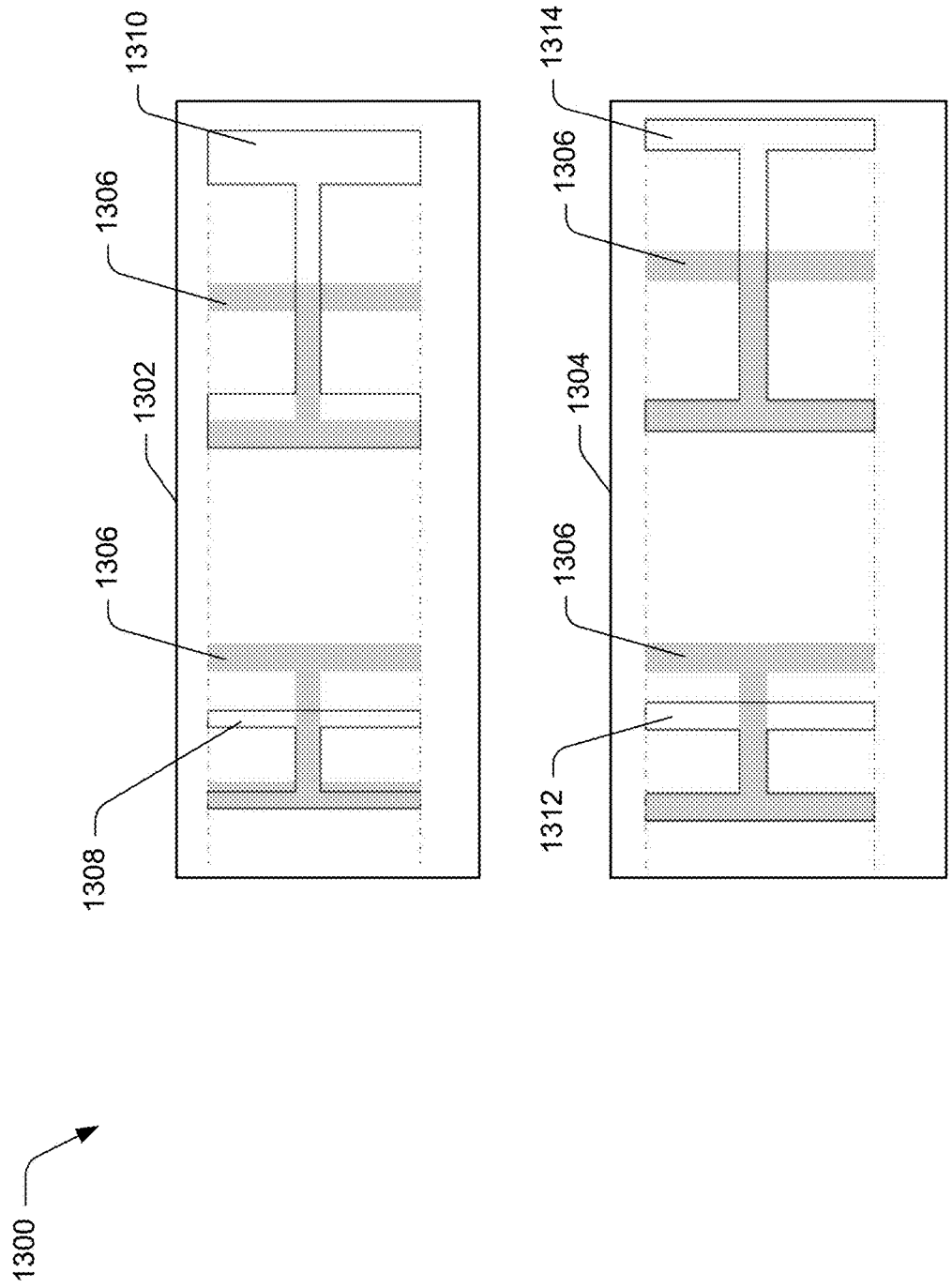
FIG. 13 illustrates an example implementation in which the font modification system of FIG. 1 synthesizes font by modifying glyph width.

FIG. 13 illustrates an example implementation 1300 of generating synthesized font by modifying font width attributes. The illustrated example includes a fake width modification 1302 and a true width modification 1304 of an unmodified glyph 1306 of a local font. In the fake width modification 1302, when the unmodified glyph 1306 is scaled horizontally (e.g., increased in width or decreased in width), a thickness of the unmodified glyph 1306's vertical stems increases or decreases accordingly. This increase or decrease in vertical stem thickness is illustrated by a fake condensed modification 1308 and a fake extended modification 1310 of the unmodified glyph 1306.

To avoid this increase or decrease in vertical stem thickness, which results in a typographically incorrect appearance of a resulting modified glyph, the font synthesis module 122 is configured to modify a horizontal weight of the unmodified glyph 1306 while preserving vertical stem thicknesses. Such a preservation is illustrated in the true width modification 1304, where the true extended modification 1314 and the true extended condensed modification 1312 maintains a vertical stem thickness of the unmodified glyph 1306.

Figure 14:
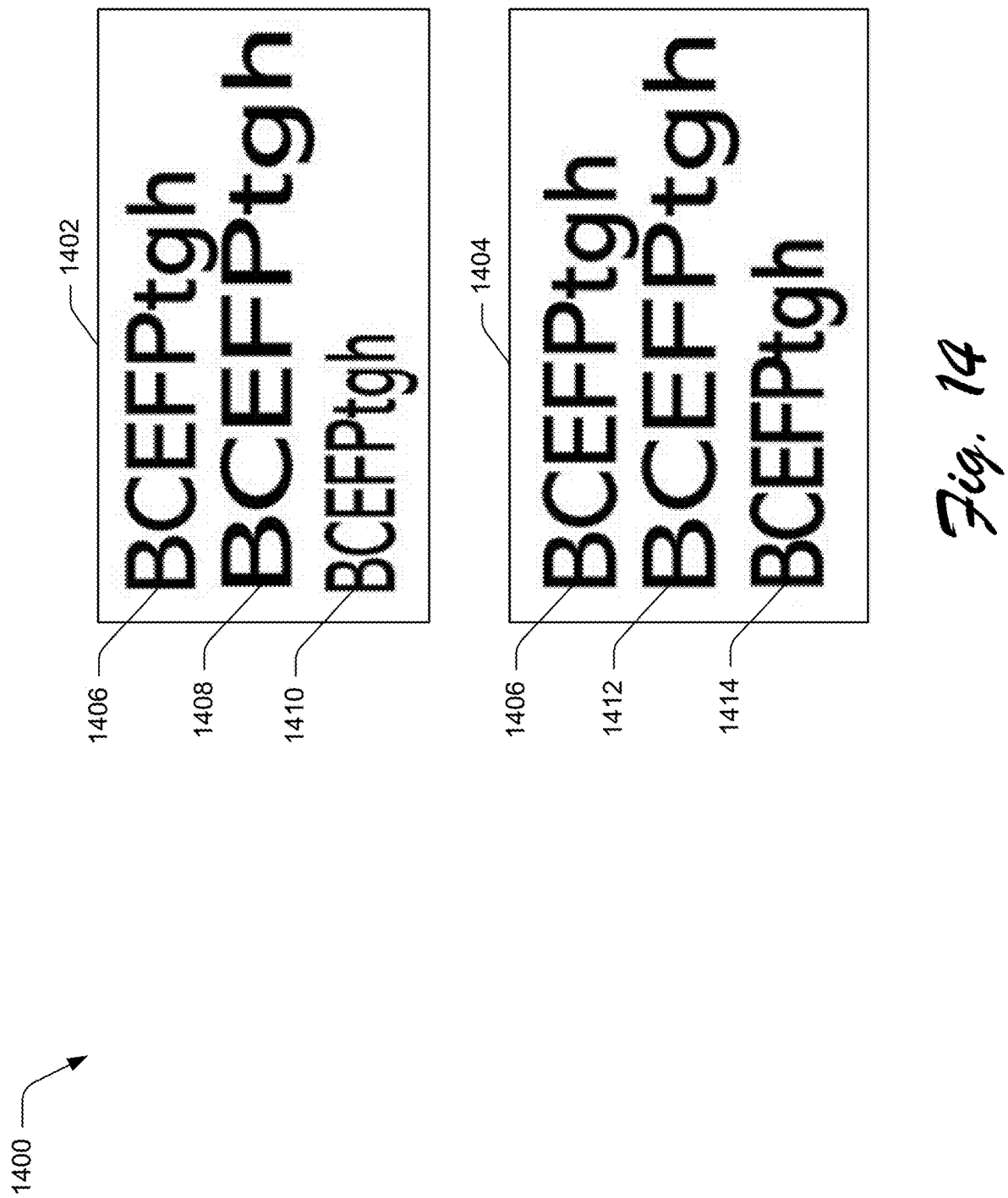
FIG. 14 illustrates an example implementation in which the font modification system of FIG. 1 synthesizes font by modifying glyph width.

FIG. 14 illustrates an example implementation 1400 of generating synthesized font by modifying font width attributes. In the illustrated example, a false width modification 1402 and true width modification 1404 are depicted, which each represent modifications of an unmodified glyphs 1406. Specifically, the false width modification 1402 illustrates a false extended modification 1408 and a false condensed modification 1410 of the unmodified glyphs 1406. Similarly, the true width modification 1404 illustrates a true extended modification 1412 and a true condensed modification 1414 of the unmodified glyphs 1406. Contrasted with the false width modification 1402, the true with modification 1404 preserves vertical stem thicknesses of unmodified glyphs 1406. In this manner, the font synthesis module 122 is configured to generate synthesized font 116 through false width modifications, true width modifications, and combinations thereof. Having considered example implementations of generating synthesized font by modifying font width attributes, consider now examples of generating synthesized font by modifying font CapHeight attributes.

CapHeight Attribute Modifications

Figure 15:
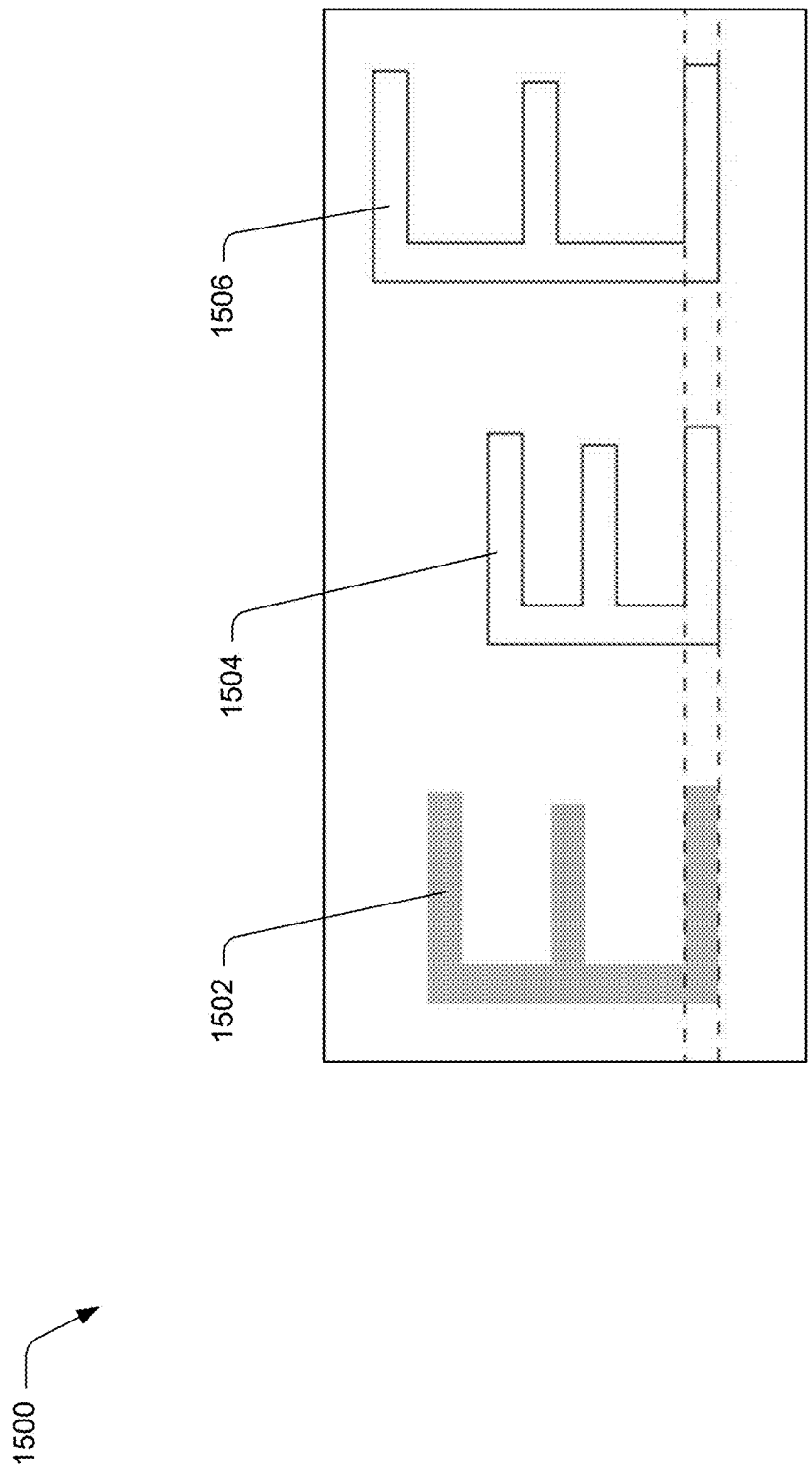
FIG. 15 illustrates an example implementation in which the font modification system of FIG. 1 synthesizes font by modifying the font's CapHeight.

FIG. 15 illustrates an example implementation 1500 of generating synthesized font by modifying CapHeight font attributes. In the illustrated example, an unmodified glyph 1502 can be modified by the font synthesis module 122 to alter an appearance of one or more glyphs of a local font 202. For instance, the font synthesis module 122 may generate small-cap glyphs as well as high-cap glyphs by modifying a CapHeight font attribute of the unmodified glyph 1502. To do so, the font synthesis module 122 may scale the unmodified glyph 1502 in a vertical direction, which similarity scales a thickness of horizontal glyph stems. To maintain typographical accuracy during such modifications, the font synthesis module 122 is configured to maintain a thickness of the horizontal glyph stems by modifying a vertical weight of the scaled glyph to increase or decrease the thickness of the horizontal glyph stems resulting from the vertical scaling.

The font synthesis module 122 is configured to generate a small-cap glyph 1504 by modifying a CapHeight attribute of the unmodified glyph 1502 to downscale the unmodified glyph 1502 in a vertical direction while increasing a vertical weight of the downscaled glyph to preserve horizontal glyph stem thicknesses. In this manner, the font synthesis module 122 may decrease a height of the unmodified glyph 1502 while maintaining a visual appearance of the original unmodified glyph 1502 by preserving a thickness of horizontal glyph stems. Similarly, the font synthesis module 122 is configured to generate a high-cap glyph 1506 by upscaling the unmodified glyph 1502 in a vertical direction and decreasing a vertical weight of the upscaled glyph, thereby preserving thickness of the unmodified glyph 1502's horizontal glyph stems while decreasing a vertical height of the glyph relative to the baseline.

Figure 16:
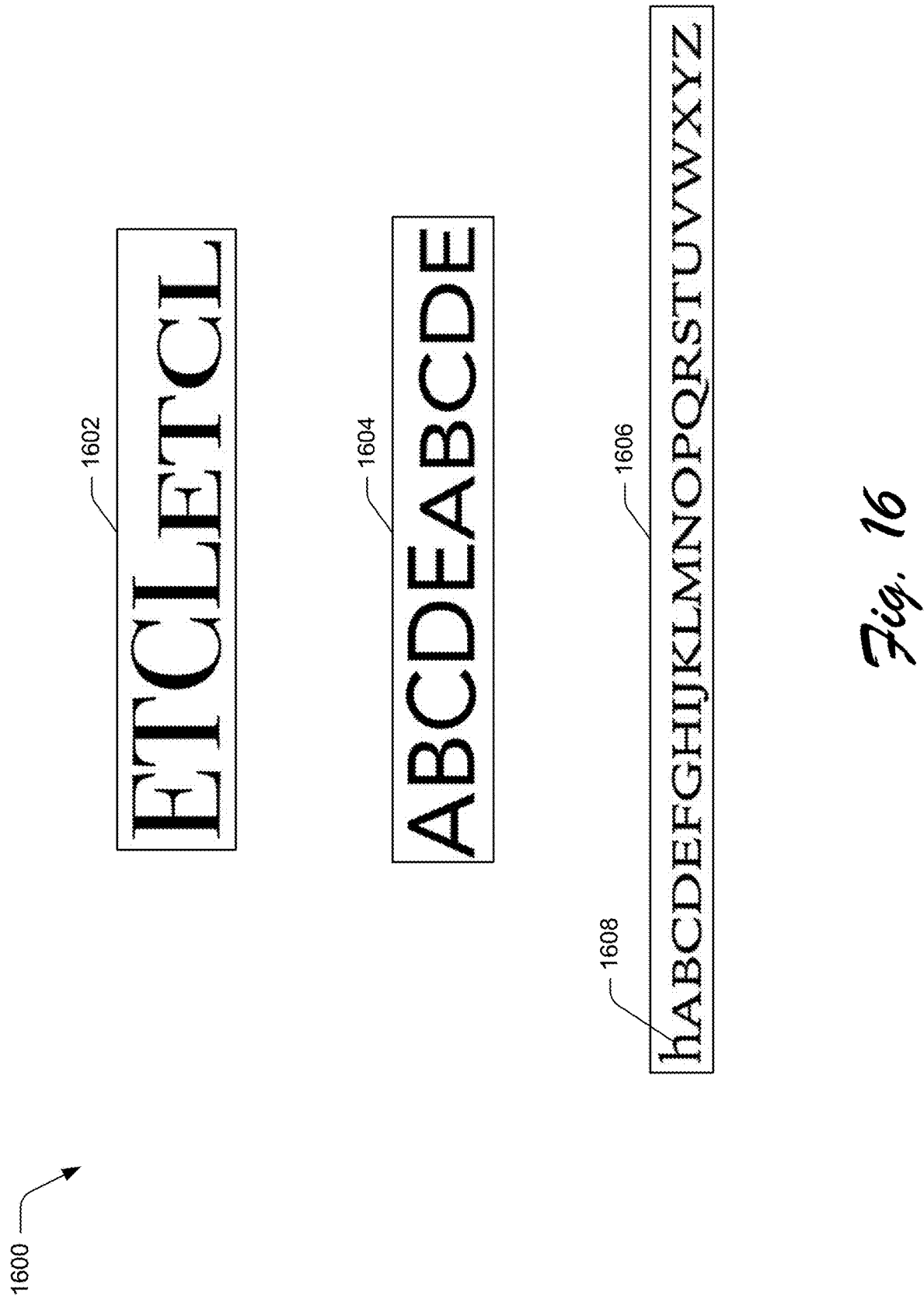
FIG. 16 illustrates an example implementation in which the font modification system of FIG. 1 synthesizes font by modifying the font's CapHeight.

FIG. 16 illustrates an example implementation 1600 of generating synthesized font by modifying CapHeight font attributes. The illustrated example includes representation 1602, which includes small-cap glyphs (right) generated from corresponding unmodified glyphs (left). In a similar manner, the illustrated example includes representation 1604, which includes small-cap glyphs (right) generated from unmodified glyphs (left). Representation 1606 illustrates small-cap glyphs generated from unmodified glyphs as well as a glyph 1608 that is representative of a lower-case glyph for an unmodified font to illustrate how CapHeight font attributes can be adjusted such that capital glyphs can be modified to have a lower height relative to a baseline than a lower-case glyph. Having considered example implementations of generating synthesized font by modifying font CapHeight attributes, consider now examples of generating synthesized font by modifying font xHeight attributes.

xHeight Attribute Modifications

Figure 17:
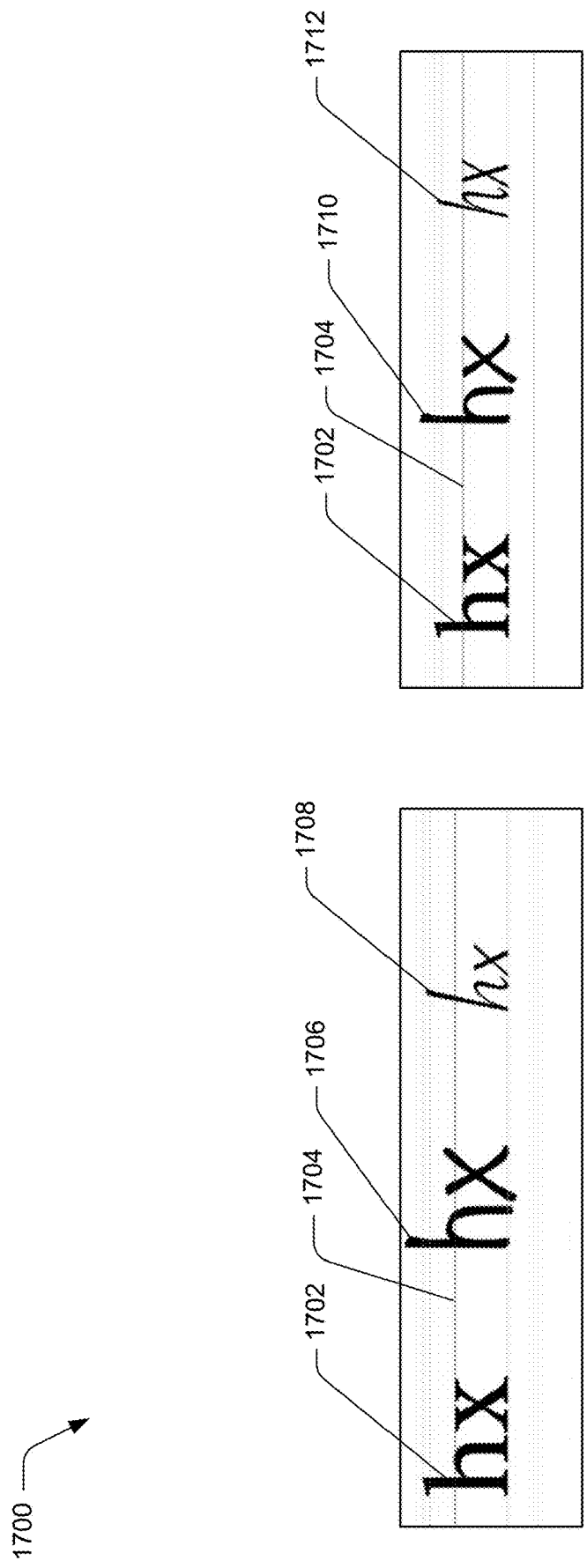
FIG. 17 illustrates an example implementation in which the font modification system of FIG. 1 synthesizes font by modifying the font's xHeight.

FIG. 17 illustrates an example implementation 1700 of generating synthesized font by modifying glyph xHeight attributes in accordance with one or more implementations. Because xHeight attributes define a distance between a baseline and a mean line of a lowercase letter in a typeface (e.g., the height of the lowercase letter "x" in a typeface), xHeight is a significant feature of typeface identification and readability. For instance, fonts having a large xHeight relative to a total height of the font have relatively shorter ascenders and descenders and less white space between lines of glyphs.

The font synthesis module 122 is configured to identify the xHeight of a font from font attributes, such as font attributes described by the font descriptor 112 of a source font 108 or the font descriptor 204 of a local font 202. In some implementations, the font synthesis module 122 is configured to identify font attributes for an Open Type font based on the font's OS/2 table. Once the xHeight is identified, the font synthesis module 122 may be implemented to scale points between the xHeight and a baseline and the font synthesis module 122 can apply a vertical weight delta value to modify the horizontal bars to compensate for scaling the points.

In some implementations, the font synthesis module 122 modifies a glyph's xHeight by modifying points disposed between the identified xHeight and a baseline. For each such point, this modification may be expressed as:

$$xheightFactor = \frac{(requested\ xheight)}{(xheight)}$$

$$DeltaY = P.y - baseline$$

$$pModified.y = baseline + xheightFactor * DeltaY$$

where: xheightFactor represents a scaling amount; P.y is a y-coordinate of the point; baseline is the baseline of a glyph; DeltaY is the distance from the baseline of the glyph; and pModified.y is a modified y-coordinate of the point. In an example where a font is italic with an 'angle,' the modification can be further expressed as:

$$p.Modified.x = P.x + \frac{(pModified.y - P.y)}{\tan(angle)}$$

where: P.y is a y-coordinate of the point; pModified.y is a modified y-coordinate of the point; angle is the angle of the italic font; P.x is an x-coordinate of the point; and p.Modified.x is a modified x-coordinate of the point.

Continuing this example, the font synthesis module 122 can be implemented to apply the vertical weight delta value to compensate for the decrease in thickness of horizontal bars of the glyph. After applying the vertical weight delta value, the font synthesis module 122 can output modified points and generate xHeight modification which can be expressed as:

$$P.x = pModified.x$$

$$P.y = pModified.y$$

where: P.x is the modified x-coordinate of the point; and P.y is the modified y-coordinate of the point.

As shown in FIG. 17, an input glyph set 1702 having a requested xHeight 1704 as well as a first unmodified glyph set 1706 having a first xHeight and a second unmodified glyph set 1708 having a second xHeight. In one or more implementations, the font synthesis module 122 is configured to generate a first modified glyph set 1710 having the requested xHeight 1704 by modifying the first unmodified glyph set 1706 and a second modified glyph set 1712 also having the requested xHeight 1704 by modifying the second unmodified glyph set 1708.

Figure 18:
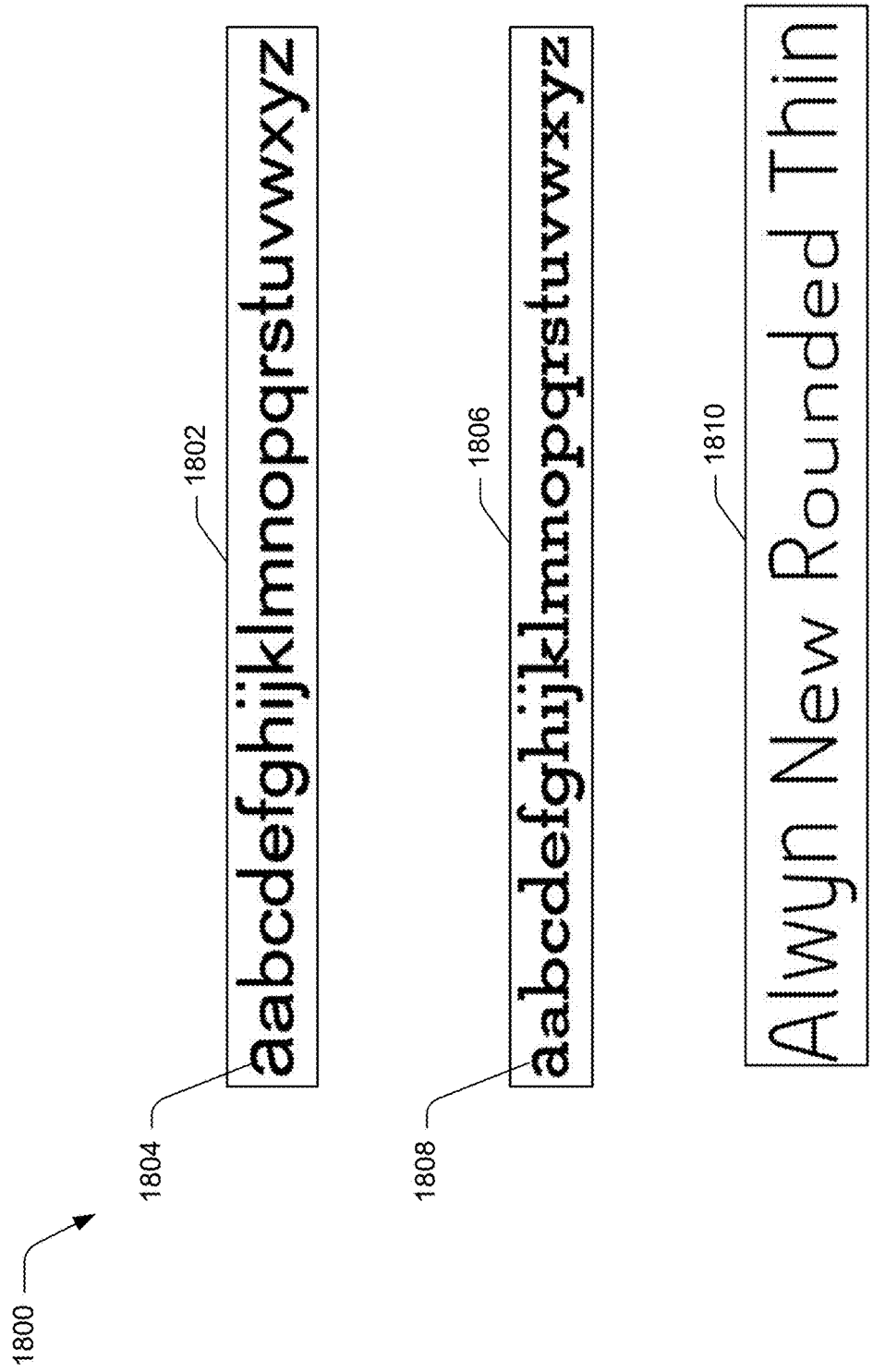
FIG. 18 illustrates an example implementation in which the font modification system of FIG. 1 synthesizes font by modifying the font's xHeight.

FIG. 18 illustrates an example implementation 1800 of generating synthesized font by modifying one or more xHeight attributes of a local font 202. In the illustrated example, representation 1802 depicts a lowered xHeight attribute for a font, with an unmodified glyph 1804 included for reference. Representation 1806 illustrates a different example of a lowered xHeight attribute for a font, contrasted against an unmodified glyph 1808. Representation 1810 depicts an example scenario where different xHeight modifications can be applied to different glyphs of a local font 202 to generate a synthesized font 116. Having considered example implementations of generating synthesized font by modifying font xHeight attributes, consider now examples of generating synthesized font by modifying font ascent attributes.

Ascent Attribute Modifications

Figure 19:
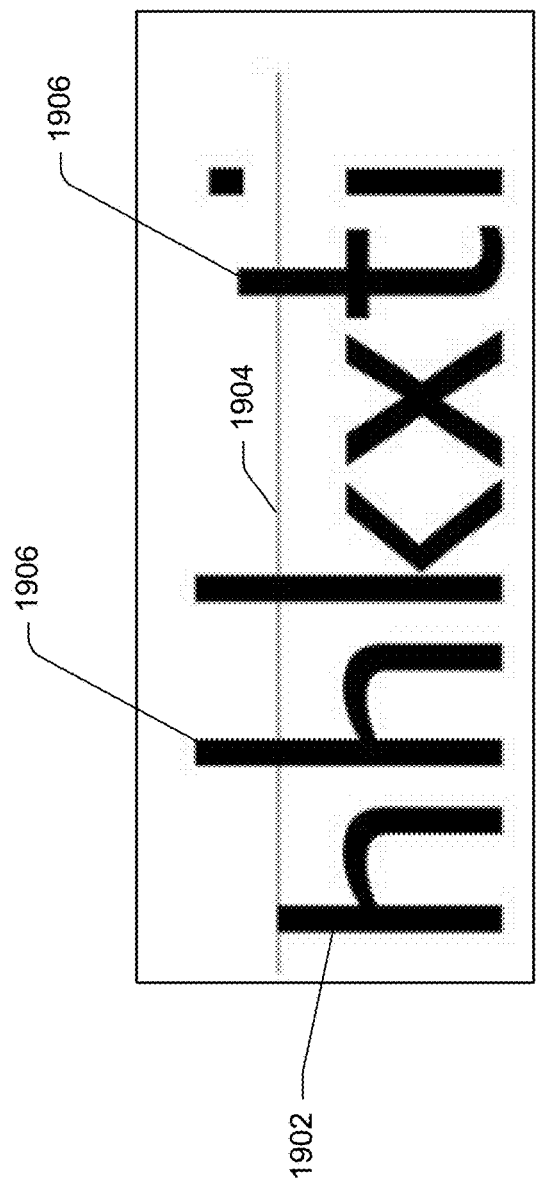
FIG. 19 illustrates an example implementation in which the font modification system of FIG. 1 synthesizes font by modifying the font's ascent.

FIG. 19 illustrates an example implementation 1900 of generating synthesized font by modifying glyph ascent attributes in accordance with one or more implementations. As described above, an ascent attribute refers to a maximum height above a baseline to which glyphs of a font may extend. In the illustrated example, glyph 1902 is illustrated as ascending above a baseline to an ascent line 1904. Glyphs 1906 and 1908 are illustrative of examples in which the font synthesis module 122 adjusts font ascent attributes differently, such that glyphs 1906 and 1908 extend from the baseline beyond the ascent line 1904 with different magnitudes. Having considered example implementations of generating synthesized font by modifying font ascent attributes, consider now examples of generating synthesized font by modifying font descent attributes.

Descent Attribute Modifications

Figure 20:
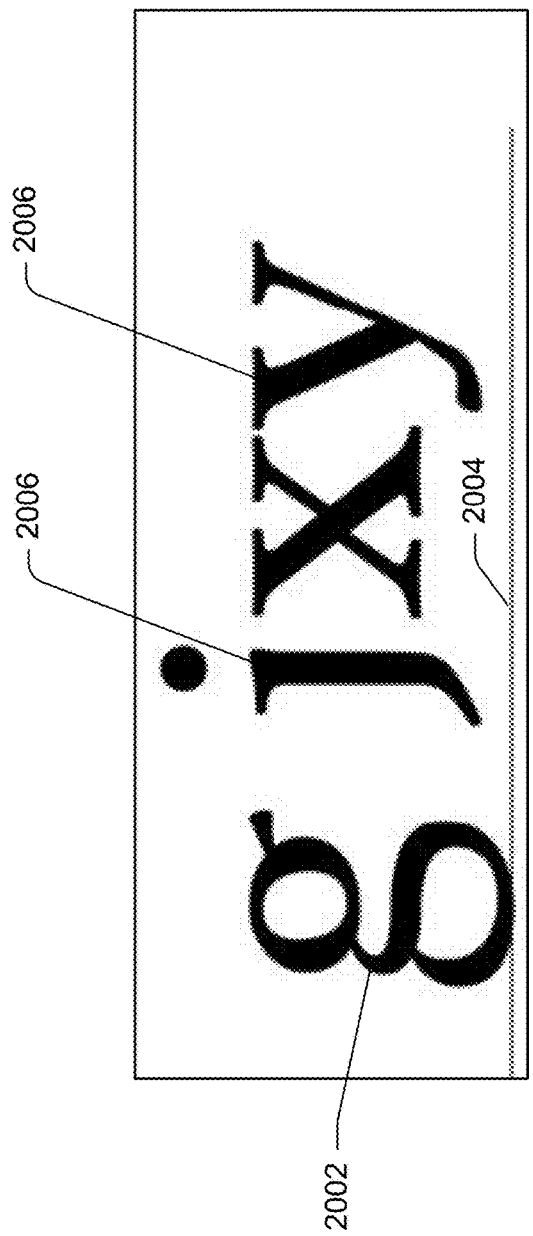
FIG. 20 illustrates an example implementation in which the font modification system of FIG. 1 synthesizes font by modifying the font's descent.

FIG. 20 illustrates an example implementation 2000 of generating synthesized font by modifying glyph descent attributes in accordance with one or more implementations. As described above, a descent attribute refers to a maximum depth below a baseline to which glyphs of a font may extend. In the illustrated example, glyph 2002 is illustrated as descending below a baseline (not illustrated) to a descent line 2004, while glyphs 2006 are illustrated as not descending below the baseline. To compensate for a resulting scaling of glyphs having modified descent attributes, the font synthesis module 122 is configured to adjust vertical weight attributes to modified glyphs, thereby maintaining typographical accuracy when generating the synthesized font 116. Having considered example implementations of generating synthesized font by modifying font descent attributes, consider now examples of generating synthesized font by generating new composite glyphs.

Composite Glyph Generation

Figure 21:
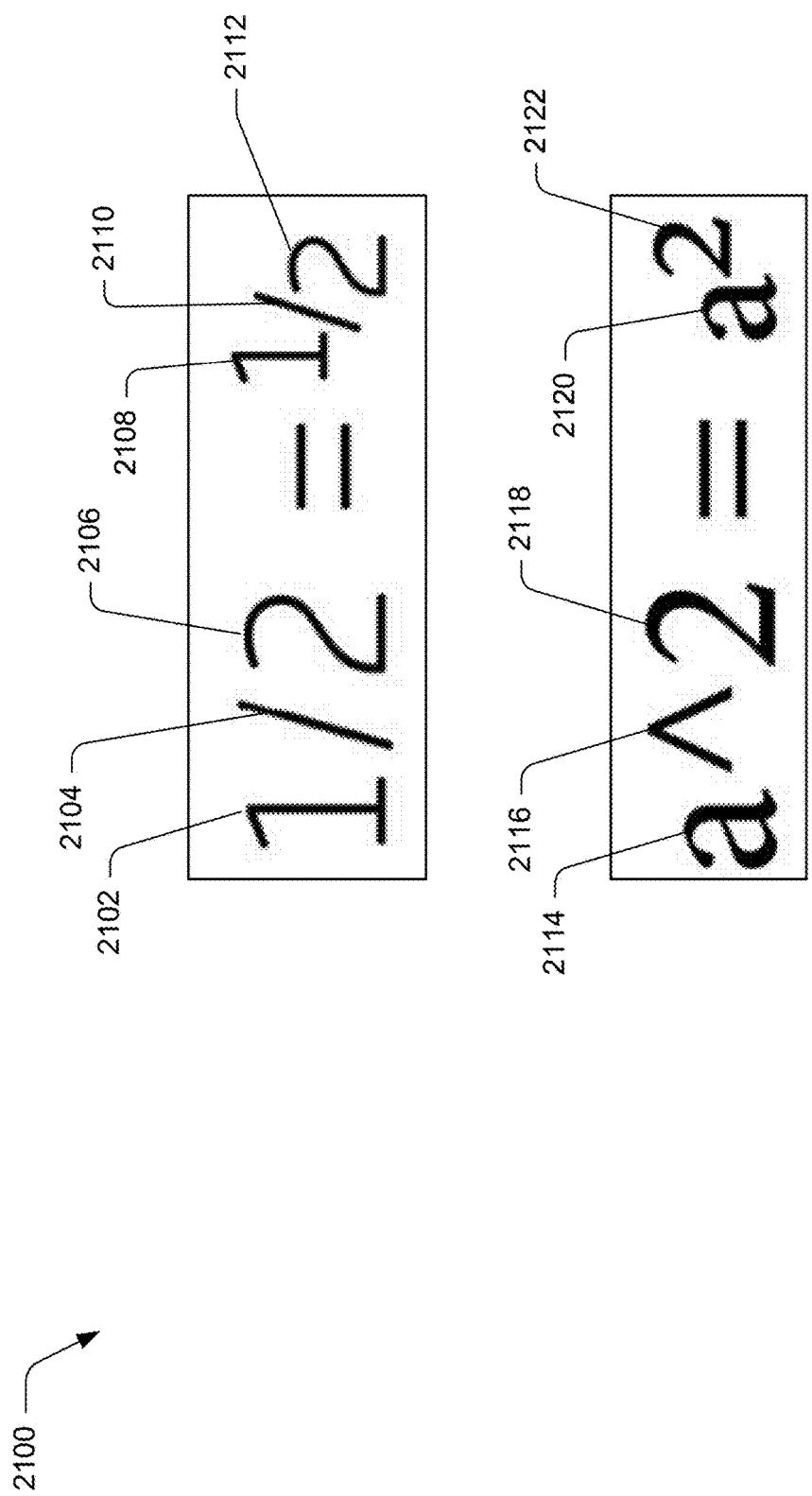
FIG. 21 illustrates an example implementation in which the font modification system of FIG. 1 synthesizes font by generating composite glyphs via glyph weight modification.

FIG. 21 illustrates an example implementation 2100 of generating synthesized font by generating composite glyphs. In the illustrated example, a first glyph 2102, a second glyph 2104, and a third glyph 2106 are oriented such that the glyphs 2102, 2104, and 2106 are aligned horizontally in line with one another. The font synthesis module 122 is configured to modify the glyphs 2102, 2104, and 2106 by scaling the glyphs and modifying one or more of a horizontal or vertical weight for individual ones of the glyphs 2102, 2104, and 2106, which may result in a first modified glyph 2108, a second modified glyph 2110, and a third modified glyph 2112. In the illustrated example, the glyphs 2108, 2110, and 2112 correspond to the glyphs 2102, 2104, and 2106, respectively, and have been modified such that the glyphs are oriented diagonally relative to one another.

In accordance with one or more implementations, a fourth glyph 2114, a fifth glyph 2116, and a sixth glyph 2118 are oriented as representing a mathematical relationship between glyphs of the font. To generate synthesized font 116 that corresponds to a mathematical relationship otherwise represented by source font 108, the font synthesis module 122 is configured to scale the fourth glyph 2114 and the sixth glyph 2118 and modified one or more of their respective horizontal and vertical weights to generate a fourth modified glyph 2120 and a sixth modified glyph 2122, such that the fifth glyph 2116 has been removed in order for the fourth modified glyph 2120 and the sixth modified glyph 2122 to illustrate the same mathematical relationship in a manner that is visually similar to the source font 108 being emulated by the synthesized font 116. Having considered example implementations of generating synthesized font by generating new composite glyphs, consider now examples of generating synthesized font by modifying font ItalicAngle attributes.

ItalicAngle Attribute Modifications

Figure 22:
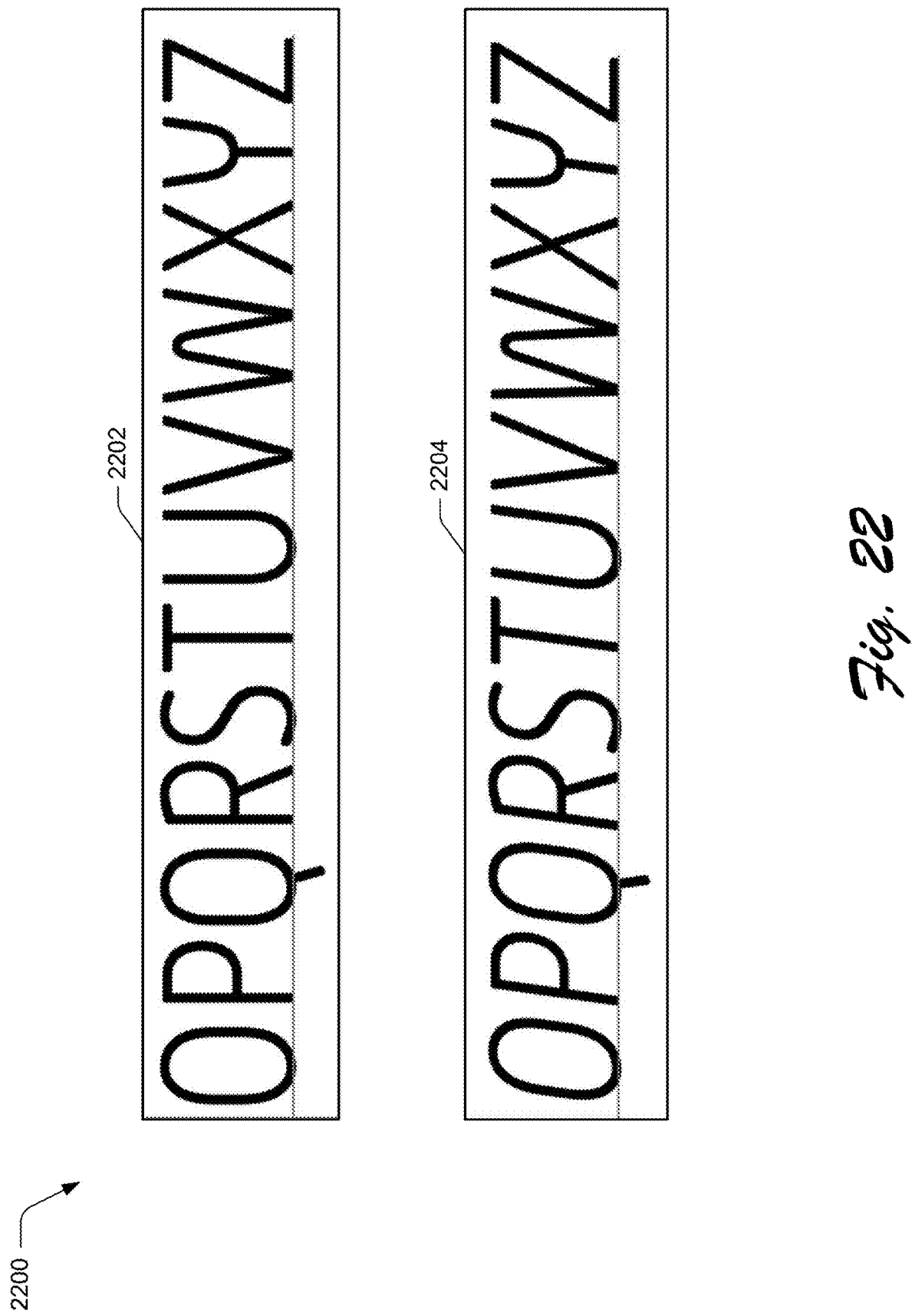
FIG. 22 illustrates an example implementation in which the font modification system of FIG. 1 synthesizes font by modifying the font's slant angle.

FIG. 22 illustrates an example implementation 2200 of generating synthesized font by modifying font ItalicAngle attributes. A font's ItalicAngle attributes refer to an angle, expressed in degrees counterclockwise from a vertical axis, of dominant vertical strokes of a font. As described herein, a font's slant angle may be modified under both oblique and italic transformations, and combinations thereof. In the illustrated example, representation 2202 includes glyphs of a font without a modified slant angle, while representation 2204 includes the glyphs as having a modified ItalicAngle attribute. Having considered example implementations of generating synthesized font by modifying font ItalicAngle attributes, consider now examples of generating synthesized font by modifying font contrast attributes.

Contrast Attribute Modifications

Figure 23:
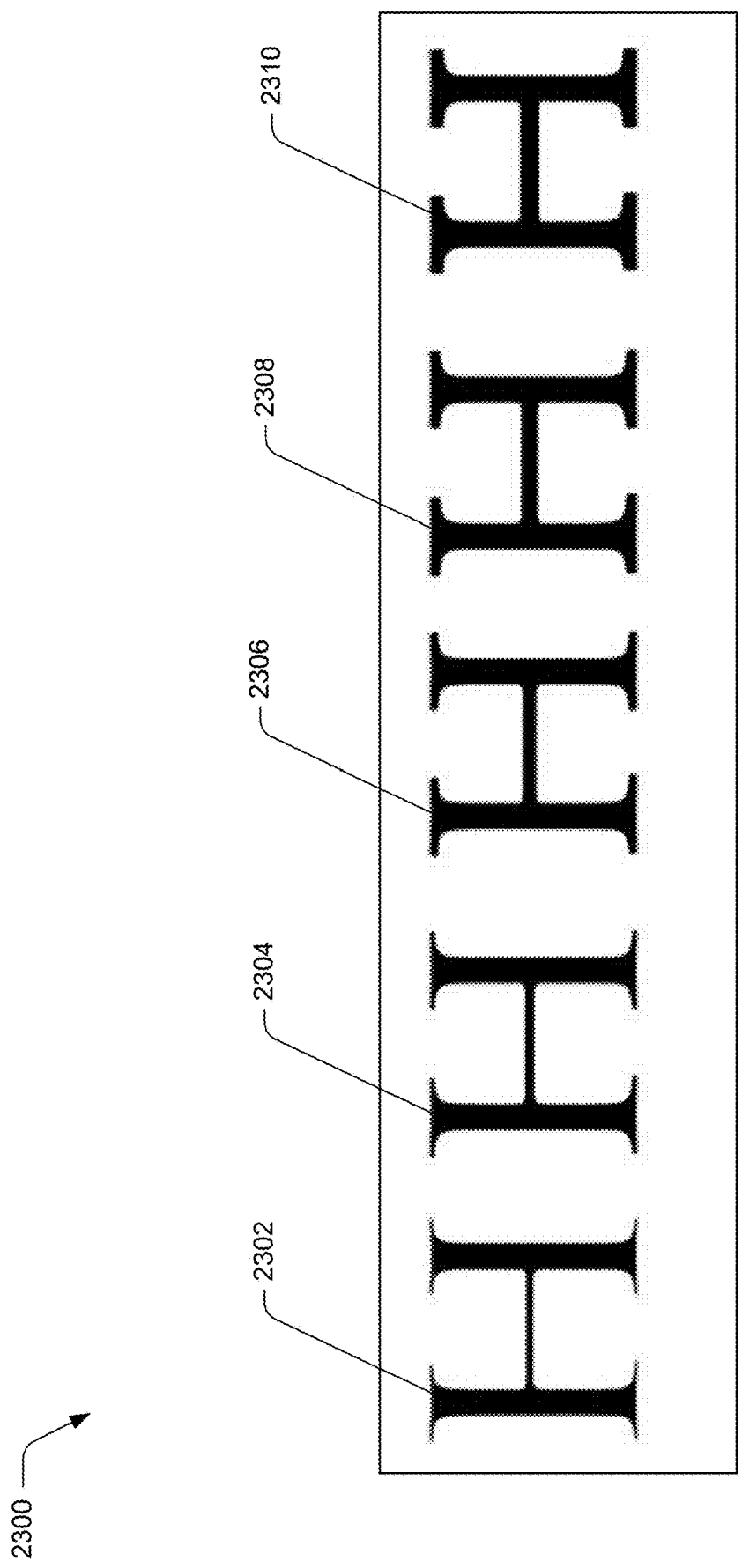
FIG. 23 illustrates an example implementation in which the font modification system of FIG. 1 synthesizes font by modifying the font's contrast.

FIG. 23 illustrates an example implementation 2300 of generating synthesized font by modifying font contrast attributes. In some implementations, such a modification of contrast attributes may be achieved via the font synthesis module 122 modifying respective vertical and/or horizontal weights of a font glyph, such as modifying respective weights of the glyph 2302. For instance, the font synthesis module 122 may generate glyphs having increased contrast (illustrated from left to right), where glyphs 2304, 2306, 2308, and 2310 represent instances of the glyph 2302 having progressively increased font contrast attributes.

The font synthesis module 122 is configured to generate synthesized font 116 using any one or combination of the above-referenced font attribute modifications, such that a local font 202 can be effectively modified to have a visually similar appearance to a source font 108, thereby enabling the computing device 102 to maintain an original design layout of the electronic document 106 in scenarios where the computing device 102 is not authorized to use the source font 108.

Having considered example implementations of generating synthesized font, consider now an example user interface useable to generate synthesized font.

Example User Interface

Figure 24:
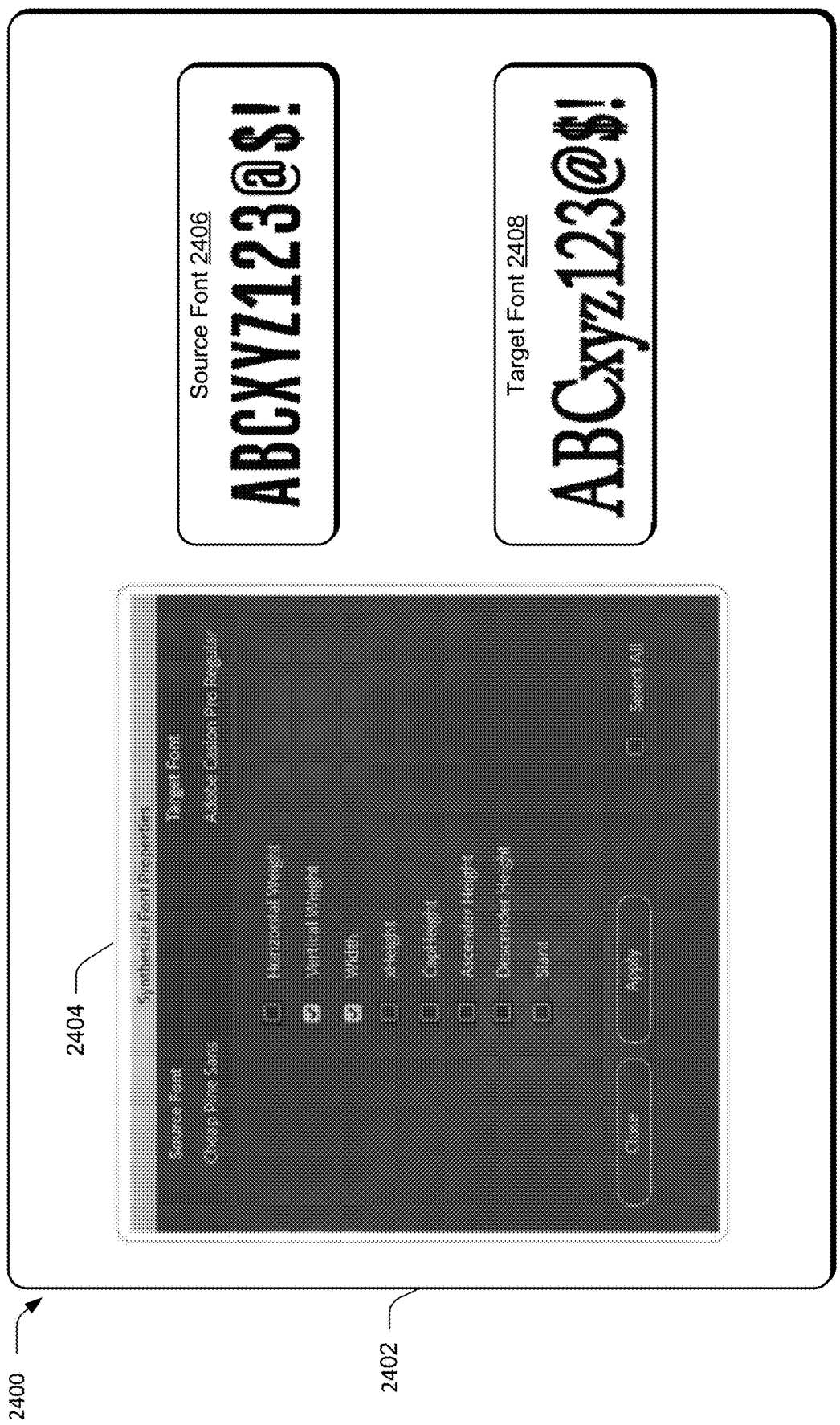
FIG. 24 illustrates an example implementation of an interface that includes a selectable font attributes that can be used to control synthesis of a target font by the font modification system of FIG. 1.

FIG. 24 illustrates an example implementation 2400 of a user interface for the font modification system 104 that may be used to facilitate generation of synthesized font 116 using the techniques described herein. The illustrated example depicts interface 2402, which includes a control 2404 configured to receive user input specifying font attributes to be transferred from a source font 2406 to a target font 2408. In the illustrated example, the control is depicted as including selectable boxes for a plurality of different font attributes, where vertical weight and width attributes of the source font 2406 are selected to be used as target values for modifying the respective vertical weight and width attributes of the target font 2408. In this manner, the font modification system 104 provides a user interface that enables a user to manually specify various font attributes of a source font 108 to be applied to a local font 202 in generating the synthesized font 116.

The illustrated interface 2402 is further configured to display a preview of the target font 2408 as modified by the selected attributes in the control 2404. Although control 2404 is illustrated as including selectable boxes, control 2404 may be configured in a variety of manners. For instance, instead of selectable boxes, each font attribute may be associated with an adjustable indicator (e.g., a slide bar, a scroll wheel, etc.) where a low end of the adjustable indicator for a font attribute corresponds to the font attribute value for the target font 2408 and a high end of the adjustable indicator corresponds to the font attribute value for the source font 2406. In this manner, a user of the font modification system 104 can fine-tune how synthesized font 116 is generated from a local font 202, using font attributes of a source font 108.

Having considered example details of generating synthesized font, consider now some example procedures to illustrate aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-24.

Figure 25:
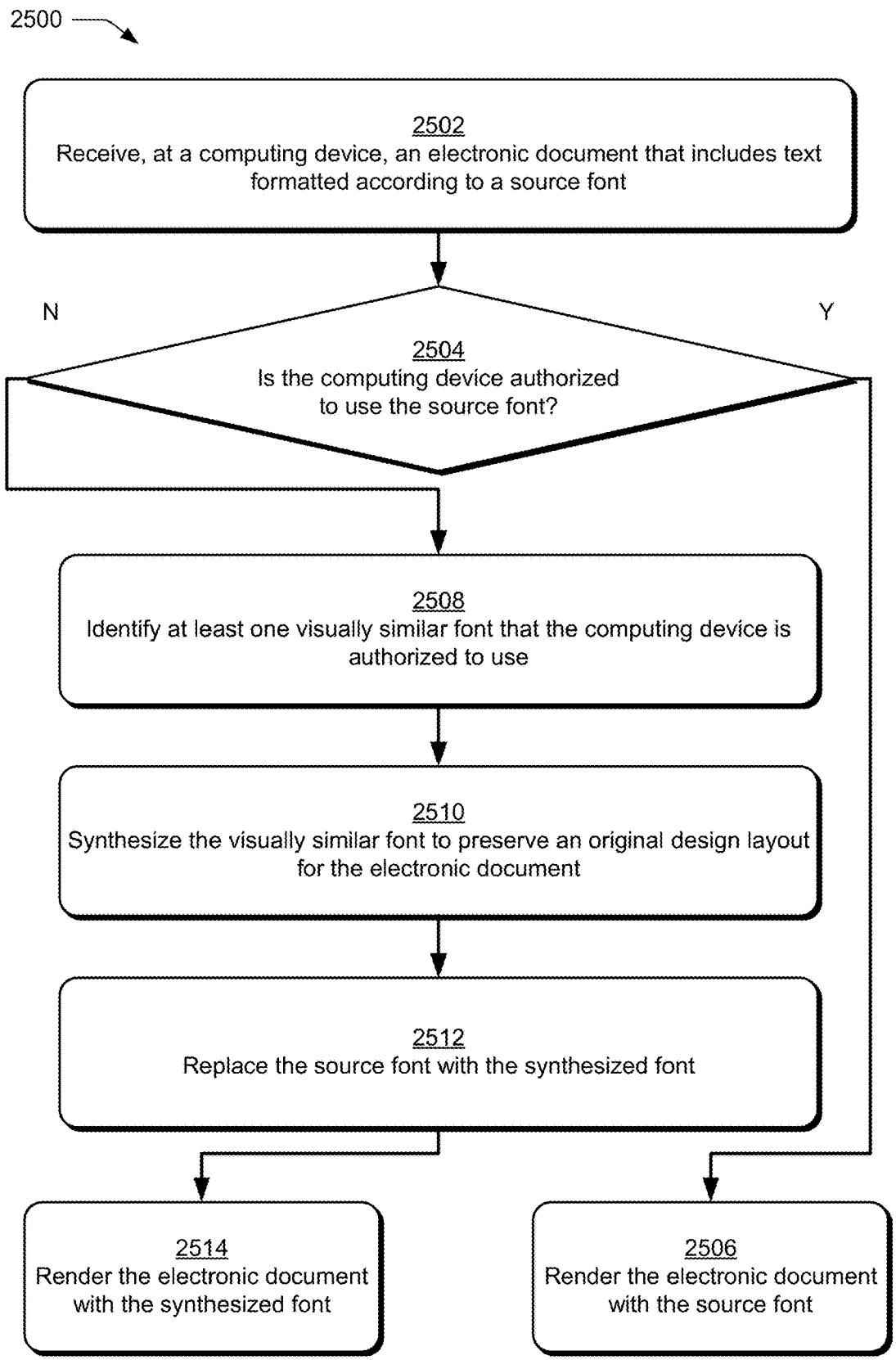
FIG. 25 is a flow diagram depicting a procedure in an example implementation for rendering an electronic document with synthesized font using the techniques described herein.

FIG. 25 depicts a procedure 2500 in an example implementation of generating a synthesized font using the techniques described herein. An electronic document that includes text formatted according to a source font is received at a computing device (block 2502). The computing device 102 implementing the font modification system 104, for instance, receives electronic document 106 including source font 108 defined by font descriptor 112 from the different computing device 114.

A determination is made as to whether the computing device is authorized to use the source font (block 2504). In response to determining that the computing device is authorized to use the source font, the computing device renders the electronic document with the source font (block 2506). Alternatively, in response to determining that the computing device is not authorized to use the source font, at least one visually similar font that the computing device is authorized to use is identified (block 2508). The font similarity module 120, for instance, identifies at least one local font 202 that is available for use by the computing device 102 by comparing the font descriptor 112 for the source font 108 against respective local font descriptors 204, such as local font descriptors generated by the local font descriptor module 118. In some implementations, the font similarity module 120 is configured to select a single local font 202 that is most visually similar to the source font 108.

The visually similar font is then synthesized to preserve an original design layout for the electronic document (block 2510). The font synthesis module 122, for instance, leverages information included in the font descriptor 112 for the source font 108 and the local font descriptor 204 for the most visually similar local font 202 to identify an array of design vectors that are to be applied to the local font 202 to achieve a visually similar appearance to the source font 108. After determining the array of design vectors, the font synthesis module 122 applies the array of design vectors to one or more glyph outlines of the local font 202 to generate synthesized font 116. The synthesized font 116 can then be output by the rendering module 124 as synthesized font 116. In some implementations, the synthesized font 116 is output as a preview display for acceptance by a user of the computing device implementing the font modification system 104 prior to replacement of the source font.

The source font is then replaced with the synthesized font in the electronic document (block 2512). The electronic document with the synthesized font is then rendered (block 2514). The rendering module 124, for instance, may output the electronic document 106 with the synthesized font 116 in place of the source font 108, such that the electronic document 106 is rendered at the computing device 102 using only fonts that the computing device 102 is authorized to use, while preserving an original design layout of the electronic document 106.

Figure 26:
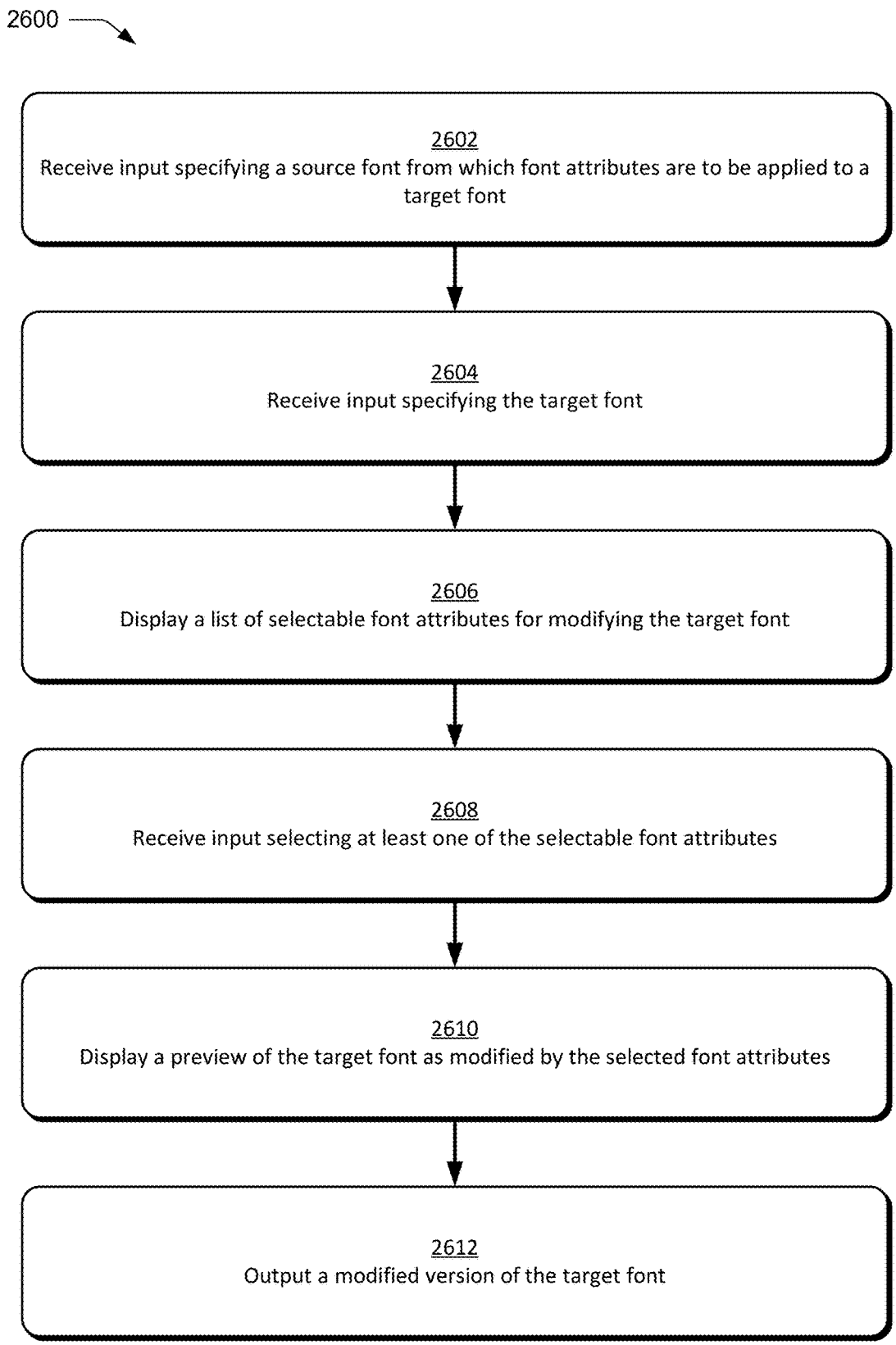
FIG. 26 is a flow diagram depicting a procedure in an example implementation for generating synthesized font using the techniques described herein.

FIG. 26 depicts a procedure 2600 in an example implementation of generating synthesized font using the techniques described herein. Input specifying a source font from which font attributes are to be applied to a target font is received (block 2602). The font modification system 104, for instance, may receive input specifying a source font 108 from which one or more font attributes 318, as specified by the source font 108's font descriptor 112, are to be applied to a target font. Input is then received specifying the target font (block 2604). The font modification system 104, for instance, may receive input specifying a local font 202 to be modified using the one or more font attributes 318.

A list of selectable font attributes useable for modifying the target font are then displayed (block 2606). The rendering module 124, for instance, may output interface 2402 together with a control 2404 that lists the one or more font attributes 318 of the source font 108 to be used as values for modifying the local font 202. Input is then received selecting at least one of the selectable font attributes (block 2608). The font modification system 104, for instance, may receive an indication of input selecting certain font attributes for the source font 108 to be used as target metrics for modifying corresponding font attributes of the local font 202.

A preview of the target font as modified using the selected font attributes is then displayed (block 2610). The rendering module 124, for instance, outputs a display of the target font 2408 as modified by the font attributes selected in control 2404. A modified version of the target font can then be output (block 2612). The rendering module 124, for instance, may output the synthesized font 116 in response to receiving input at control 2404 accepting the modifications to the target font 2408 as modified using the one or more font attributes 318 of the source font 2406.

Having described example procedures in accordance with one or more implementations, consider now an example system and device that can be utilized to implement the various techniques described herein.

Example System and Device

Figure 27:
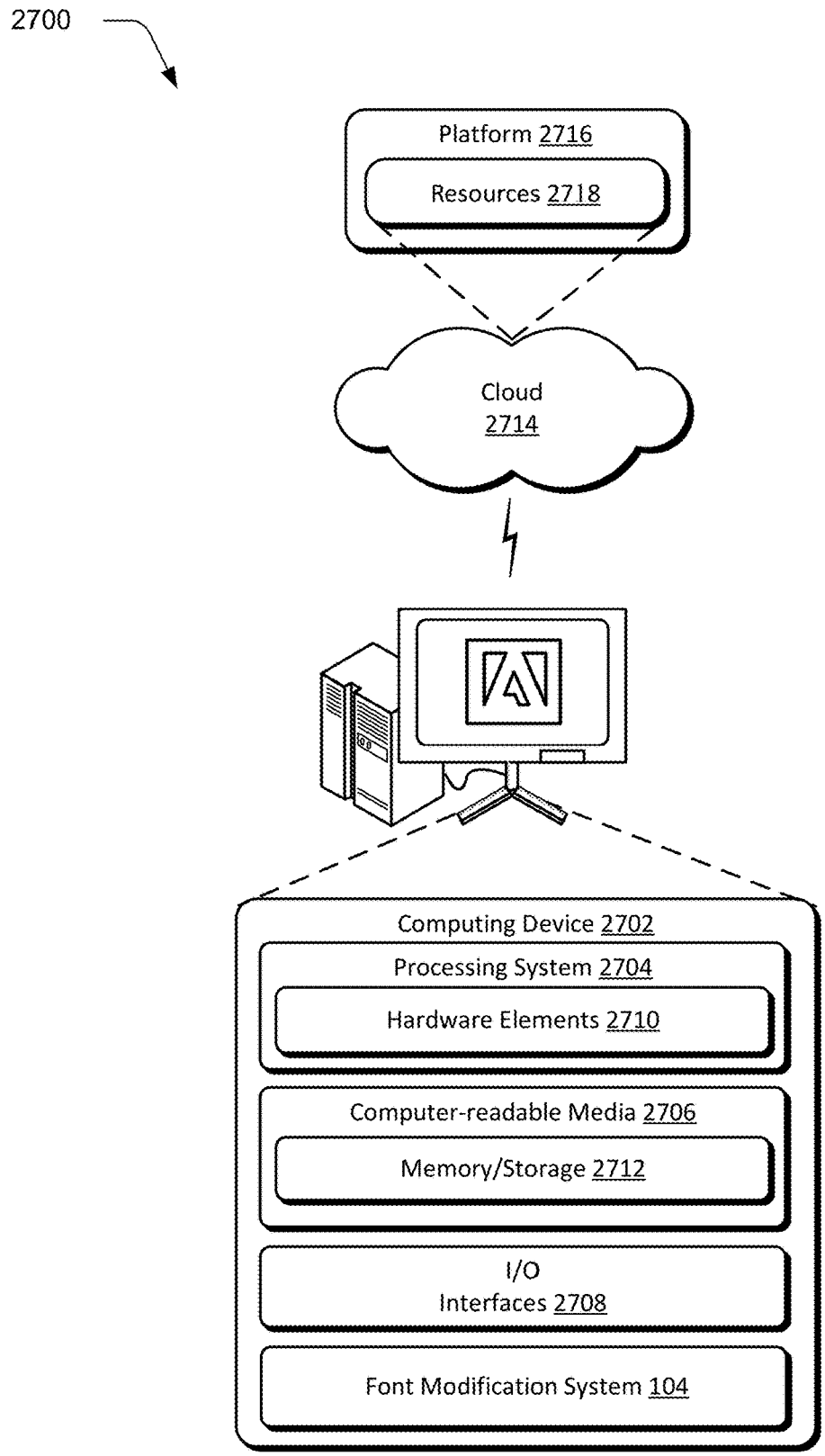
FIG. 27 illustrates an example system including various components of an example device that can be implemented as a computing device as described and/or utilized with reference to FIGS. 1-26 to implement the techniques described herein.

FIG. 27 illustrates an example system 2700 that includes an example computing device 2702 that is representative of one or more computing systems and/or devices that may implement the various techniques described herein. This is illustrated through inclusion of the font modification system 104. The computing device 2702 may be, for example, a server of a service provider, a device associated with a client (e.g., a client device), an on-chip system, and/or any other suitable computing device or computing system.

The example computing device 2702 as illustrated includes a processing system 2704, one or more computer-readable media 2706, and one or more I/O interface 2708 that are communicatively coupled, one to another. Although not shown, the computing device 2702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2704 is representative of functionality to perform one or more operations using hardware. Accordingly, the processing system 2704 is illustrated as including hardware elements 2710 that may be configured as processors, functional blocks, and so forth. This may include implementation in hardware as an application specific integrated circuit or other logic device formed using one or more semiconductors. The hardware elements 2710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2706 is illustrated as including memory/storage 2712. The memory/storage 2712 represents memory/storage capacity associated with one or more computer-readable media. The memory/storage 2712 may include volatile media (such as random access memory (RAM)) and/or nonvolatile media (such as read only memory (ROM), Flash memory, optical disks, magnetic disks, and so forth). The memory/storage 2712 may include fixed media (e.g., RAM, ROM, a fixed hard drive, and so on) as well as removable media (e.g., Flash memory, a removable hard drive, an optical disc, and so forth). The computer-readable media 2706 may be configured in a variety of other ways as further described below.

Input/output interface(s) 2708 are representative of functionality to allow a user to enter commands and information to computing device 2702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2710 and computer-readable media 2706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2710. The computing device 2702 may be configured to implement particular instructions and/or functions corresponding to the software and/or hardware modules. Accordingly, implementation of a module that is executable by the computing device 2702 as software may be achieved at least partially in hardware, e.g., through use of computer-readable storage media and/or hardware elements 2710 of the processing system 2704. The instructions and/or functions may be executable/operable by one or more articles of manufacture (for example, one or more computing devices 2702 and/or processing systems 2704) to implement techniques, modules, and examples described herein.

The techniques described herein may be supported by various configurations of the computing device 2702 and are not limited to the specific examples of the techniques described herein. This functionality may also be implemented all or in part through use of a distributed system, such as over a "cloud" 2714 via a platform 2716 as described below.

The cloud 2714 includes and/or is representative of a platform 2716 for resources 2718. The platform 2716 abstracts underlying functionality of hardware (e.g., servers) and software resources of the cloud 2714. The resources 2718 may include applications and/or data that can be utilized while computer processing is executed on servers that are remote from the computing device 2702. Resources 2718 can also include services provided over the Internet and/or through a subscriber network, such as a cellular or Wi-Fi network.

The platform 2716 may abstract resources and functions to connect the computing device 2702 with other computing devices. The platform 2716 may also serve to abstract scaling of resources to provide a corresponding level of scale to encountered demand for the resources 2718 that are implemented via the platform 2716. Accordingly, in an interconnected device embodiment, implementation of functionality described herein may be distributed throughout the system 2700. For example, the functionality may be implemented in part on the computing device 2702 as well as via the platform 2716 that abstracts the functionality of the cloud 2714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving, by a computing device, an electronic document that includes a source font that the computing device is not authorized to render;
    identifying, by the computing device, a source font descriptor that describes font attributes for the source font;
    identifying, by the computing device, a local font that the computing device is authorized to render and is visually similar to the source font using the source font descriptor;
    generating, by the computing device, a synthesized font by automatically modifying an outline of at least one glyph of the local font to have a visual appearance that is similar to a corresponding glyph of the source font using at least one of the font attributes for the source font described in the source font descriptor; and
    rendering, by the computing device, the electronic document with the synthesized font in place of the source font.

2. The method of claim 1, wherein identifying the local font that is visually similar to the source font comprises:
    generating a ranked list of local fonts by comparing, for each of a plurality of different local fonts, a local font descriptor to the source font descriptor; and
    selecting the local font from the ranked list of local fonts.

3. The method of claim 2, wherein comparing the local font descriptor for one of the plurality of different local fonts to the source font descriptor comprises comparing the font attributes for the source font to font attributes for the one of the plurality of different local fonts and computing a vector array describing differences between the font attributes for the source font to the font attributes for the one of the plurality of different local fonts, wherein generating the ranked list of local fonts is performed using the vector array.

4. The method of claim 1, wherein modifying the outline of the at least one glyph of the local font is performed independent of modifying an original font-program for the local font.

5. The method of claim 1, wherein modifying the outline of the at least one glyph of the local font is performed in memory of the computing device.

6. The method of claim 1, wherein the source font descriptor is not reversible by the computing device to render the source font.

7. The method of claim 1, further comprising:
    displaying the local font as part of displaying multiple local fonts; and
    detecting user input selecting the local font from the multiple local fonts, wherein identifying the local font is performed in response to detecting the user input.

8. The method of claim 1, wherein modifying the outline of the at least one glyph of the local font comprises adjusting a vertical thickness of one or more horizontal stems of the at least one glyph.

9. The method of claim 1, wherein modifying the outline of the at least one glyph of the local font comprises adjusting a horizontal thickness of one or more vertical stems of the at least one glyph.

10. The method of claim 1, wherein modifying the outline of the at least one glyph of the local font comprises adjusting a depth below a baseline for the local font to which the outline of the at least one glyph extends.

11. The method of claim 1, wherein modifying the outline of the at least one glyph of the local font comprises adjusting a height of the at least one glyph relative to a baseline for the local font.

12. The method of claim 1, wherein modifying the outline of the at least one glyph of the local font comprises preventing overlap of segments of the at least one glyph that have a point in common and are oriented in opposite directions by changing coordinates of the point in common.

13. The method of claim 1, wherein modifying the outline of the at least one glyph of the local font comprises maintaining an origin of the at least one glyph.

14. The method of claim 1, wherein modifying the outline of the at least one glyph of the local font comprises adjusting a width of the at least one glyph.

15. The method of claim 1, wherein modifying the outline of the at least one glyph of the local font comprises adjusting an angle relative to a vertical axis of one or more vertical strokes of the at least one glyph.

16. The method of claim 1, further comprising:
displaying, by the computing device, a control for each of the font attributes that define a visual appearance of the source font;
receiving, by the computing device, input at the control for one of the font attributes indicating that font attribute for the source font for use in modifying glyph outlines for a plurality of different glyphs in the synthesized font; and
modifying, by the computing device, the synthesized font based on the input.

17. A system comprising:
at least one processor; and
a computer-readable storage medium storing instructions that are executable by the at least one processor to perform operations comprising:
receiving an electronic document that includes a source font that the system is not authorized to render;
identifying a source font descriptor that describes font attributes for the source font;
identifying a local font that the system is authorized to render and is visually similar to the source font using the source font descriptor;
generating a synthesized font by automatically modifying an outline of at least one glyph of the local font to have a visual appearance that is similar to a corresponding glyph of the source font using at least one of the font attributes for the source font described in the source font descriptor; and
rendering the electronic document with the synthesized font in place of the source font.

18. The system of claim 17, wherein modifying the outline of the at least one glyph of the local font is performed independent of modifying an original font-program for the local font.

19. The system of claim 17, wherein modifying the outline of the at least one glyph of the local font is performed in memory of the system.

20. The system of claim 17, wherein the source font descriptor is not reversible by the system to render the source font.

* * * * *